(12) United States Patent
Kim et al.

(10) Patent No.: US 12,197,204 B2
(45) Date of Patent: Jan. 14, 2025

(54) USER INPUT PROCESSING METHOD AND ELECTRONIC DEVICE SUPPORTING SAME

(71) Applicant: Samsung Electronics Co., Ltd., Gyeonggi-do (KR)

(72) Inventors: Munsik Kim, Gyeonggi-do (KR); Kibeom Kim, Gyeonggi-do (KR); Jaeyung Yeo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 352 days.

(21) Appl. No.: 17/406,727

(22) Filed: Aug. 19, 2021

(65) Prior Publication Data
US 2021/0383806 A1 Dec. 9, 2021

Related U.S. Application Data

(63) Continuation of application No. PCT/KR2020/002327, filed on Feb. 18, 2020.

(30) Foreign Application Priority Data

Feb. 19, 2019 (KR) ........................ 10-2019-0019546

(51) Int. Cl.
*G05D 1/00* (2024.01)
*G06N 5/04* (2023.01)
(Continued)

(52) U.S. Cl.
CPC ......... *G05D 1/0016* (2013.01); *G05D 1/0255* (2013.01); *G06N 5/04* (2013.01);
(Continued)

(58) Field of Classification Search
None
See application file for complete search history.

(56) References Cited

U.S. PATENT DOCUMENTS 7,447,564 B2 * 11/2008 Yasukawa ............ B25J 19/0008
379/38
9,259,842 B2 2/2016 Fouillade et al.
(Continued)

FOREIGN PATENT DOCUMENTS

JP 2013-061715 4/2013
KR 10-2014-0106891 9/2014
(Continued)

OTHER PUBLICATIONS

PCT/ISA/210 Search Report issued on PCT/KR2020/002327 pp. 3.
(Continued)

*Primary Examiner* — Jonathan C Kim
(74) *Attorney, Agent, or Firm* — The Farrell Law Firm, P.C.

(57) ABSTRACT

An apparatus and method are provided for processing a user input in an electronic device. The method includes storing information associated with each of a plurality of users; receiving a user utterance associated with task execution of the electronic device; transmitting, to an external device, first data associated with the user utterance; receiving, from the external device, second data including information about at least one operation of the electronic device associated with the task execution, and at least one parameter for performing the at least one operation; identifying, as a target of the task execution, a first user from among the plurality of users based on the at least one parameter; inferring a location of the target based on information associated with the first user, which is included in the information associated with each of the plurality of users; moving the electronic device to a first location based on the inferred location; searching for the first user at the first location by comparing the information about the first user with information obtained at the first location; and in response to recognizing the first user at the first location, perform the at least one (Continued)

operation of the electronic device associated with the task execution.

9 Claims, 11 Drawing Sheets

(51) Int. Cl.
  *G06V 10/10* (2022.01)
  *G10L 15/08* (2006.01)
  *G10L 15/18* (2013.01)
  *G10L 15/22* (2006.01)
  *G10L 25/54* (2013.01)

(52) U.S. Cl.
  CPC .......... *G06V 10/10* (2022.01); *G10L 15/083* (2013.01); *G10L 15/18* (2013.01); *G10L 15/22* (2013.01); *G10L 25/54* (2013.01); *G10L 2015/223* (2013.01); *G10L 2015/227* (2013.01)

(56) References Cited

U.S. PATENT DOCUMENTS

| | | | |
|---|---|---|---|
| 9,471,059 B1* | 10/2016 | Wilkins | G05D 1/0016 |
| 9,557,740 B2 | 1/2017 | Crawley | |
| 9,950,431 B2 | 4/2018 | Fouillade et al. | |
| 9,983,592 B2 | 5/2018 | Hong et al. | |
| 10,534,366 B2 | 1/2020 | Choi et al. | |
| 11,433,546 B1* | 9/2022 | Assaf | B25J 5/007 |
| 2004/0066917 A1 | 4/2004 | Yasukawa et al. | |
| 2004/0093219 A1* | 5/2004 | Shin | B25J 13/003 704/E15.045 |
| 2005/0131645 A1 | 6/2005 | Panopoulos | |
| 2005/0216124 A1* | 9/2005 | Suzuki | G05D 1/0272 700/253 |
| 2006/0217837 A1* | 9/2006 | Koga | G05D 1/12 700/259 |
| 2007/0027579 A1* | 2/2007 | Suzuki | G05D 1/0251 700/245 |
| 2009/0143910 A1 | 6/2009 | Seo et al. | |
| 2012/0316676 A1 | 12/2012 | Fouillade et al. | |
| 2014/0254896 A1 | 9/2014 | Zhou et al. | |
| 2014/0316636 A1* | 10/2014 | Hong | G05D 1/0274 901/1 |
| 2015/0012163 A1 | 1/2015 | Crawley | |
| 2016/0136817 A1 | 5/2016 | Fouillade et al. | |
| 2017/0090456 A1* | 3/2017 | Mao | G05D 1/0246 |
| 2017/0300060 A1 | 10/2017 | Crawley | |
| 2017/0361468 A1* | 12/2017 | Cheuvront | G06F 3/16 |
| 2018/0143645 A1* | 5/2018 | Lee | B25J 11/001 |
| 2018/0181137 A1 | 6/2018 | Choi et al. | |
| 2018/0246520 A1* | 8/2018 | Martinson | G05D 1/0094 |
| 2018/0285070 A1 | 10/2018 | Yoon et al. | |
| 2018/0288104 A1 | 10/2018 | Padilla et al. | |
| 2019/0187703 A1* | 6/2019 | Millard | G05D 1/249 |
| 2019/0258264 A1* | 8/2019 | Bash | G06Q 10/0833 |
| 2019/0265692 A1* | 8/2019 | Miyazaki | G05D 1/0246 |
| 2019/0278294 A1* | 9/2019 | Shimada | G05D 1/0274 |
| 2019/0332105 A1* | 10/2019 | Sant | G05D 1/101 |
| 2019/0342243 A1 | 11/2019 | Lee et al. | |
| 2020/0050206 A1* | 2/2020 | Deyle | G01S 13/876 |
| 2020/0072619 A1* | 3/2020 | Fukui | G05D 1/0088 |
| 2020/0110968 A1* | 4/2020 | Onodera | G06V 10/82 |
| 2020/0148232 A1* | 5/2020 | Morrison | G05D 1/0016 |
| 2020/0164515 A1* | 5/2020 | Han | G05D 1/0274 |
| 2020/0201338 A1* | 6/2020 | Wang | G07C 9/00182 |
| 2020/0202114 A1* | 6/2020 | Yoon | H04N 23/60 |
| 2020/0241486 A1* | 7/2020 | Hong | G05B 13/0265 |
| 2020/0380699 A1* | 12/2020 | Amo | G05D 1/0248 |
| 2021/0018912 A1* | 1/2021 | Dymesich | G06F 3/0482 |
| 2021/0076008 A1* | 3/2021 | Seyfi | H04N 7/185 |
| 2021/0103281 A1* | 4/2021 | Takagi | A63H 11/00 |
| 2021/0141381 A1* | 5/2021 | Maeda | G05D 1/0255 |
| 2021/0383806 A1* | 12/2021 | Kim | G06F 3/16 |
| 2022/0017010 A1* | 1/2022 | Taniguchi | G08G 1/005 |
| 2022/0019213 A1* | 1/2022 | Haghighat Kashani | G05D 1/0231 |
| 2023/0158683 A1* | 5/2023 | Carbune | B25J 9/162 700/245 |

FOREIGN PATENT DOCUMENTS

| | | |
|---|---|---|
| KR | 1020140126539 | 10/2014 |
| KR | 10-2018-0038871 | 4/2018 |
| KR | 10-2018-0074144 | 7/2018 |
| KR | 10-2018-0075875 | 7/2018 |
| KR | 1020180109625 | 10/2018 |
| KR | 10-1919354 | 11/2018 |
| KR | 10-2018-0134628 | 12/2018 |

OTHER PUBLICATIONS

PCT/ISA/237 Written Opinion issued on PCT/KR2020/002327 pp. 5.
Korean Office Action dated Nov. 10, 2023 issued in counterpart application No. 10-2019-0019546, 15 pages.
KR Final Rejection dated Jul. 8, 2024 issued in counterpart application No. 10-2019-0019546, 8 pages.
Korean Office Action dated Oct. 16, 2024 Issued in counterpart application No. 10-2019-0019546, 10 pages.

* cited by examiner

USER INPUT PROCESSING METHOD AND ELECTRONIC DEVICE SUPPORTING SAME

CROSS-REFERENCE TO RELATED APPLICATION(S)

This application is a continuation of, and claims priority under 35 U.S.C. § 120 to, International Application No. PCT/KR2020/002327, which was filed on Feb. 18, 2020, and claims priority under 35 U.S.C. § 119(a) to Korean Patent Application No, 10-2019-0019546, which was filed in the Korean Intellectual Property Office on Feb. 19, 2019, the entire disclosure of each of which is incorporated herein by reference.

BACKGROUND

1. Field

The disclosure relates generally to an electronic device and a method thereof for processing a user input.

2. Description of Related Art

For interaction with a user, an electronic device may support various input schemes. For example, an electronic device may support a speech input scheme that receives speech data spoken by a user, based on the execution of a specified application program. Further, the electronic device may derive the user's intent by recognizing the received speech data and may support a speech recognition service for performing a task corresponding to the derived intent.

With the commercialization of speech recognition services, various operating platforms for speech recognition services are being built. For example, an electronic device may receive a user utterance including message information, recognize speech data according to the user utterance, and transmit, to an external device of a message recipient, data corresponding to the message information. However, in order to the electronic device to perform a task (e.g., transferring a message) to another user, the electronic device may have to transmit the message to an external device for interacting with a target user. Further, when communication to the external device fails or the external device is powered off, the task execution may be invalid or may be terminated without being completed.

SUMMARY

The disclosure is made to address the above-described problems, and provide at least the advantages described below.

An aspect of the disclosure is to provide a user speech input processing method that is capable of performing a task (e.g., transferring a message) by moving an electronic device to a location, at which the task corresponding to a user utterance is executed, in response to a received user utterance.

Another aspect of the disclosure is to provide an electronic device that, even when there is no location information of a target user associated with a task execution, performs a task by inferring a location of the target user.

In accordance with an aspect of the disclosure, an electronic device is provided, which includes a memory, a microphone, a communication circuit, a driving module, a sensor module, and a processor operatively connected to the memory, the microphone, the communication circuit, the driving module, and the sensor module. The processor is configured to store, in the memory, information associated with each of a plurality of users, receive, through the microphone, a user utterance associated with task execution of the electronic device, transmit, using the communication circuit, to an external device, first data associated with the user utterance, receive, using the communication circuit, from the external device, second data including information about at least one operation of the electronic device associated with the task execution and at least one parameter for performing the at least one operation, identify, as a target of the task execution, a first user from among the plurality of users based on the at least one parameter, infer a location of the target based on information associated with the first user from among the information associated with each of the plurality of users in the memory, move, by controlling the driving module, the electronic device to a first location based on the inferred location, search for the first user at the first location by comparing the information about the first user with information obtained at the first location by using at least one of the sensor module or the microphone, and in response to recognizing the first user at the first location, perform the at least one operation of the electronic device associated with the task execution.

In accordance with another aspect of the disclosure, an electronic device is provided, which includes a housing; a user interface; a driving unit configured to move the housing; a first sensor; a second sensor; a wireless communication circuit; a processor operatively connected to the user interface, the driving unit, the first sensor, the second sensor, and the wireless communication circuit; and a memory operatively connected to the processor. The memory stores instructions that, when executed, cause the processor to receive a user utterance for performing a task through the user interface, identify a location of a target of the task, based on at least one of first information sensed by using the first sensor or second information received from an external device through the wireless communication circuit, move, by using the driving unit, the housing to the location, recognize an object by using the second sensor, determine whether the recognized object matches the target, and perform the task on the object through the user interface.

In accordance with another aspect of the disclosure, a method is provided for an electronic to process a user input. The method includes storing information associated with each of a plurality of users; receiving a user utterance associated with task execution of the electronic device; transmitting, to an external device, first data associated with the user utterance; receiving, from the external device, second data including information about at least one operation of the electronic device associated with the task execution, and at least one parameter for performing the at least one operation; identifying, as a target of the task execution, a first user from among the plurality of users based on the at least one parameter; inferring a location of the target based on information associated with the first user, which is included in the information associated with each of the plurality of users; moving the electronic device to a first location based on the inferred location; searching for the first user at the first location by comparing the information about the first user with information obtained at the first location; and in response to recognizing the first user at the first location, perform the at least one operation of the electronic device associated with the task execution.

BRIEF DESCRIPTION OF THE DRAWINGS

The above and other aspects, features, and advantages of the present invention will become more apparent by describing in detail embodiments thereof with reference to the attached drawings in which.

DETAILED DESCRIPTION

Hereinafter, various embodiments of the disclosure will be described with reference to accompanying drawings. However, it should be understood that this description is not intended to limit the disclosure to specific implementation forms and includes various modifications, equivalents, and/or alternatives of the described embodiments of the disclosure.

Figure 1:
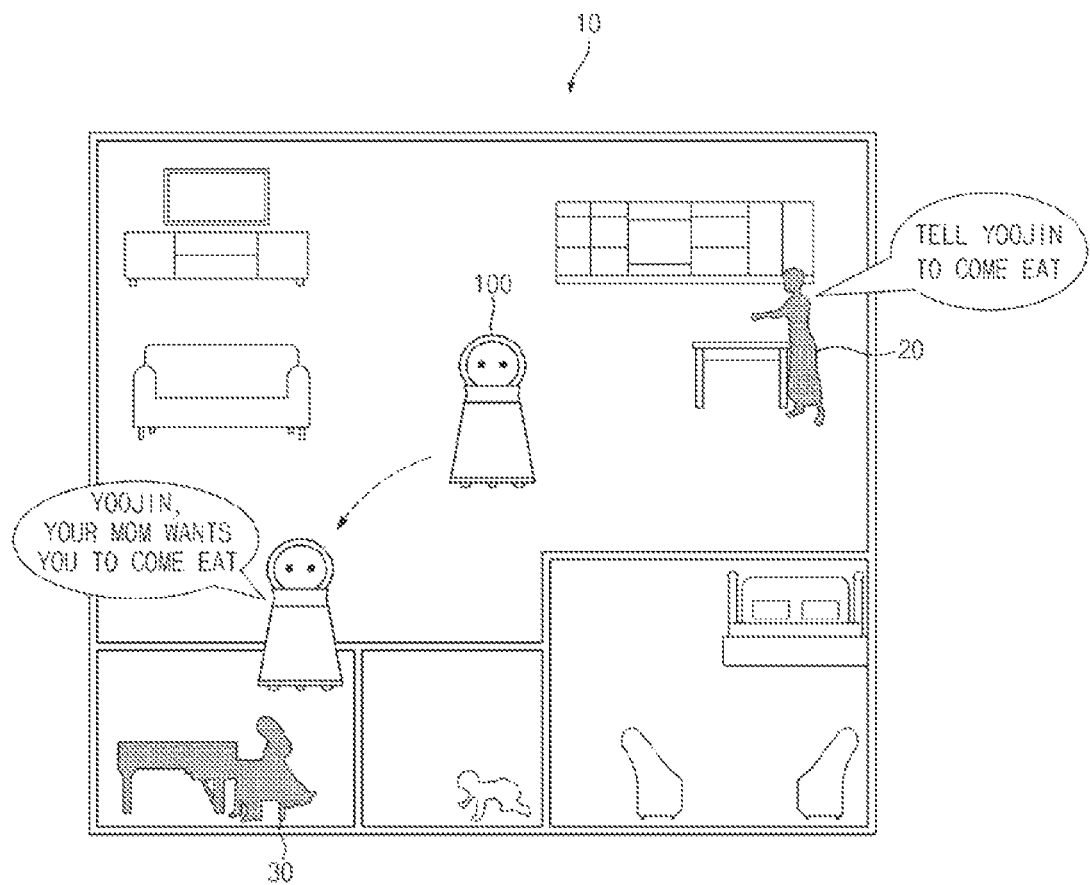
FIG. 1 illustrates an example of an electronic device operation, according to an embodiment.
Figure 2:
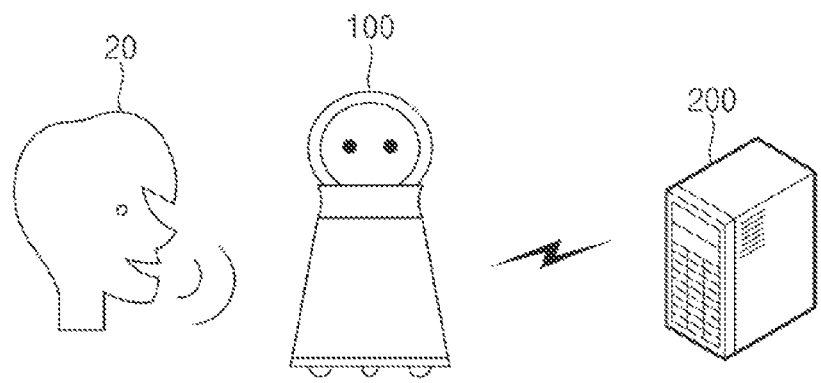
FIG. 2 illustrates an intelligent system, according to an embodiment.

FIG. 1 illustrates an example of an operation of an electronic device, according to an embodiment. FIG. 2 illustrates an intelligent system, according to an embodiment.

Referring to FIGS. 1 and 2, an electronic device 100 receives speech data according to an utterance of a first user 20 in a specific space 10 (e.g., a home, an office, a classroom, a workplace, etc.) in which the electronic device 100 is located. The electronic device 100 may receive speech data through a microphone and then process the received speech data. Accordingly, the electronic device 100 may perform an operation associated with the processed speech data, and/or a state of the electronic device 100 may be transitioned depending on the processed speech data. For example, a user utterance may be a task command utterance including a command or intent associated with the execution of a specific task of the electronic device 100 (e.g., "Tell Yoojin to come eat"). The electronic device 100 may perform a task corresponding to the user utterance by processing speech data corresponding to the user utterance through an interaction with an intelligent server 200 connected through a network.

As another example, the user utterance may be a wake-up utterance for controlling a state change of the electronic device 100 (e.g., "Hi, Chat Bot!" or "wake up!").

The user utterance may also be for activating a speech recognition service function. For example, the utterance may transition the electronic device 100 from a basic listening state to a wake-up state capable of processing speech data received after waking-up. In this case, the user utterance may include a specified wake-up keyword associated with a transition of a wake-up state of the electronic device 100 (e.g., "Chat Bot"). When the wake-up keyword is recognized, the electronic device 100 may transition to the wake-up state capable of processing a task command utterance (e.g., "Tell Yoojin to come eat").

In addition to a wake-up utterance, the electronic device 100 may transition to the wake-up state in response to a user's manipulation of a button on electronic device 100 or via a command received from a remote control device or a mobile phone.

More specifically, when a user utterance received from the first user 20 is a task command utterance that commands or intends to perform a specific task (e.g., "tell Yoojin to come eat"), the electronic device 100 may transmit, to the intelligent server 200, speech data according to an utterance of the first user 20. The intelligent server 200 may support a speech recognition service of the electronic device 100 based on the recognition of the speech data. The electronic device 100 may pre-process (e.g., echo cancellation, background noise suppression, volume control, equalization, speech end point detection, etc.) speech data corresponding to the utterance of the first user 20 in order for the intelligent server 200 to reliably recognize speech data and then transmit the pre-processed speech data to the intelligent server 200.

The intelligent server 200 may derive the intent of the utterance of the first user 20 by using speech data received from the electronic device 100. In addition, the intelligent server 200 may generate a sequence of operations for the electronic device 100 associated with the task execution, and then transmit the sequence of operations to the electronic device 100, so that the electronic device 100 may perform a task corresponding to the derived utterance intent of the first user 20.

Alternatively, the functional operation of the intelligent server 200 may be performed by the electronic device 100. That is, the electronic device 100 may recognize speech data corresponding to an utterance of the first user 20 on its own, may then derive the utterance intent of the first user 20, and generate or select a sequence of operations for performing a task corresponding to the utterance intent of the first user 20.

The electronic device 100 may perform a task, which is commanded or intended by the first user 20, by operating based on a sequence of operations. The sequence may also include at least one parameter message content, a message recipient, etc.) for performing an operation (or performing a task).

The electronic device 100 may identify a second user 30, which is a target of the task execution, based on a parameter included in the sequence and may estimate a location of the second user 30 based on information associated with the second user 30. The information associated with the second user 30 may be stored in advance in the electronic device 100. The electronic device 100 may move to the estimated location and search for the second user 30 by using information obtained through at least one sensor. For example, the at least one sensor may be included in the electronic device 100 and/or mounted at the corresponding location.

When the second user 30 is recognized based on the information associated with the second user 30 in the search operation, the electronic device 100 may move to a location close to the second user 30 and then output an audible command (e.g., "Yoojin, your mom wants you to come eat")

(or output a visual indication such as a video) according to a part of operations in the sequence.

Figure 3:
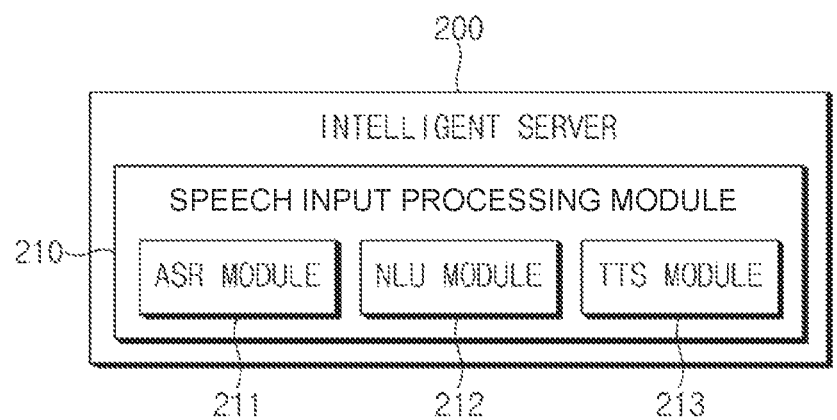
FIG. 3 illustrates an intelligent server, according to an embodiment.

FIG. 3 illustrates an intelligent server, according to an embodiment.

Referring to FIG. 3, the intelligent server 200 includes a speech input processing module 210 for processing speech data according to a user utterance received from an electronic device, e.g., the electronic device 100 of FIG. 1. The speech input processing module 210 may generate at least part of a response of the electronic device 100 to the user utterance based on recognition of the speech data.

The speech input processing module 210 includes an automatic speech recognition (ASR) module 211, a natural language understanding (NLU) module 212, and a text to speech (TTS) module 213. At least one module included in the speech input processing module 210 may be implemented with hardware and/or software and may be independent of each other or may be at least partially integrated with each other.

The intelligent server 200 may further include a processor that controls a functional operation of the speech input processing module 210, a memory that stores at least one model associated with recognition of the speech data, and/or a communication circuit that supports communication with the electronic device 100.

The ASR module 211 may recognize speech data received from the electronic device 100 and convert the recognized speech data into text data. The ASR module 211 may convert the speech data into the text data by using an acoustic model including at least one information about an utterance or phonation or a language model including at least one unit phoneme information and information about the combination of unit phonemes. The ASK module 211 may transmit the converted text data to the electronic device 100 by using the communication circuit.

In The NLU module 212 may receive the text data from the ASK module 211 and derive the intent of the user utterance associated with the speech data, based on the text data. The NLU module 212 may divide the text data into grammatical units (e.g. words, phrases, or morphemes), analyze grammatical elements or linguistic features for each unit, and determine the meaning of the text data. Accordingly, the NLU module 212 may derive the intent of the user utterance associated with the speech data.

The NLU module 212 may obtain a domain, intent, and a parameter for expressing the intent, from the text data based on the derived user utterance intent. The NLU module 212 may generate a sequence of operations of the electronic device 100 for performing a task corresponding to the user utterance intent based on the obtained domain, intent, and parameter. The sequence may include at least one operation information of the electronic device 100 associated with task execution and/or at least one parameter required to execute the at least one operation. The NLU module 212 may transmit the generated sequence to the electronic device 100 by using the communication circuit.

The TTS module 213 may receive a grammatical unit (e.g., a word, a phrase, a morpheme, etc.) for the text data from the NLU module 212, and convert the grammatical unit into speech, i.e., audible content. The TTS module 213 may convert the grammatical unit from text form into the speech form by changing a word class of the grammatical unit, adding a word class to the grammatical unit, and/or changing a word order of the grammatical unit, in the conversion operation. The TTS module 213 may transmit the converted speech data to the electronic device 100 by using the communication circuit.

At least part of the speech input processing module 210 described above may be included in the electronic device 100. For example, at least part of the ASR module 211, the NLU module 212, and/or the TTS module 213 of the speech input processing module 210 may be included in the electronic device 100 in order to support at least part of the recognition of the speech data or the generation of a response to the speech data.

Figure 4:
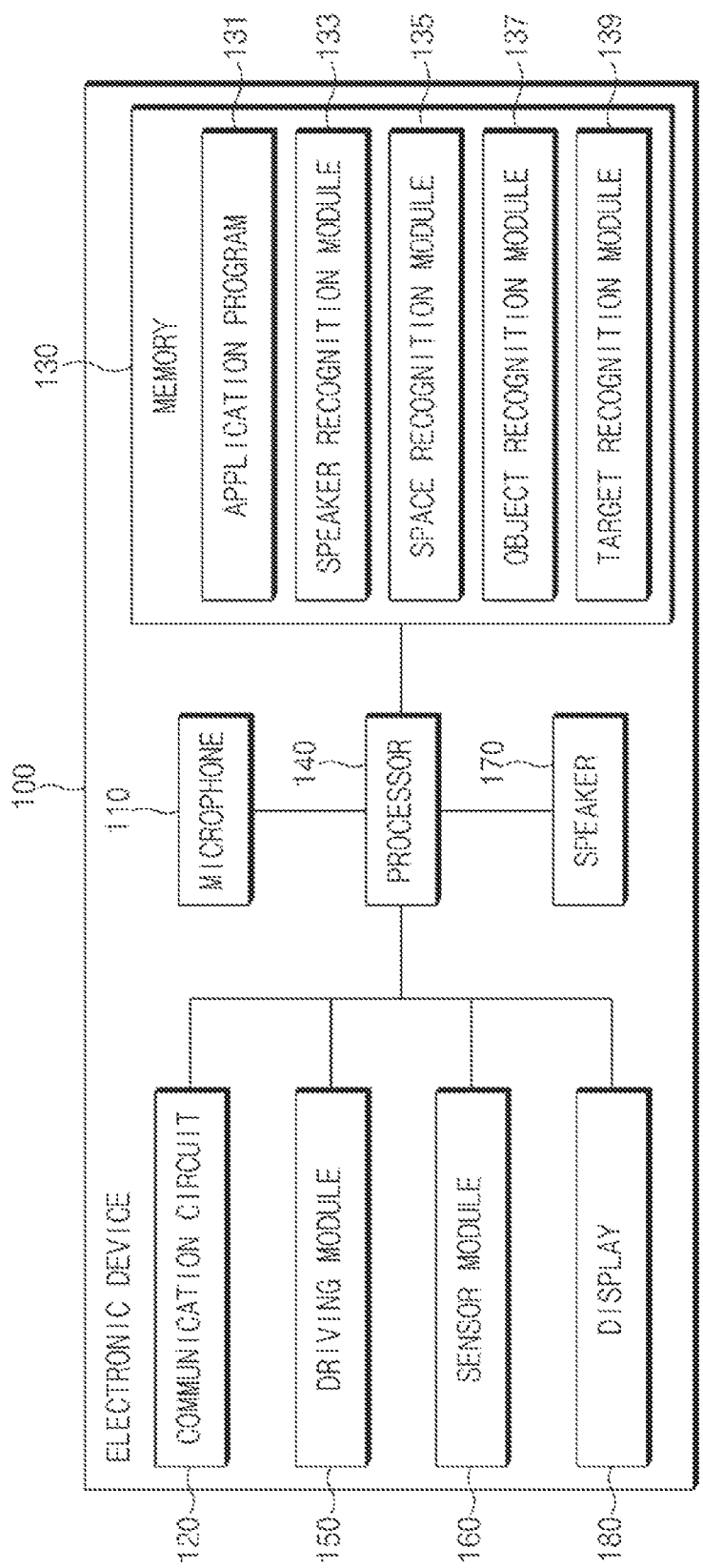
FIG. 4 illustrates an electronic device according to an embodiment.

FIG. 4 illustrates an electronic device according to an embodiment.

Referring to FIG. 4, the electronic device 100 includes a microphone 110, a communication circuit 120, a memory 130, a processor 140, a driving module 150, a sensor module 160, a speaker 170, and a display 180. Alternatively, the electronic device 100 may omit at least one of the above-described components or may further include another component. The components of the electronic device 100 may be disposed inside a housing forming at least part of an exterior of the electronic device 100 or may be connected or coupled to the housing.

The microphone 110 may receive a speech signal corresponding to a user utterance. For example, the microphone 110 may operate in an always-on state in order to receive the speech signal. Alternatively, the microphone 110 may operate after being activated, e.g., when the electronic device 100 transitions to a wake-up state in response to a user input through a remote control in an area of the electronic device 100. To efficiently receive the speech signal, the microphone 110 may include a plurality of microphones. At least part of the microphone 110 may be exposed to the outside through an area of the electronic device 100.

The communication circuit 120 may support communication between the electronic device 100 and at least one external device. For example, the communication circuit 120 may transmit and receive data or signals associated with an operation of the speech recognition service to and from the intelligent server 200 and, by establishing a network with the intelligent server 200 in FIG. 3 and accessing the network through wired communication or wireless communication according to a defined protocol. The communication circuit 120 may build an Internet of things (IoT) environment that is connected to at least one IoT device over a network in the specific space 10 in which the electronic device 100 is positioned.

The memory 130 may store data associated with an operation of the speech recognition service function of the electronic device 100 or may store at least one command associated with a functional operation control of components of the electronic device 100. The memory 130 may store speech data according to the reception of a user utterance or may store a sequence received (or generated by the electronic device 100) from the intelligent server 200.

The memory 130 may store at least one application 131. The application 131 may include an intelligent application that supports an operation of the speech recognition service of the electronic device 100. The intelligent application may execute another application associated with task execution of the electronic device 100 or may support at least part of operations of the electronic device 100 according to the sequence.

The memory 130 may further include at least one module that supports recognition of the identity of a speaker of a user utterance or recognition of a target associated with task execution. For example, in FIG. 4, the memory 130 further includes a speaker recognition module 133, a space recognition module 135, an object recognition module 137, and a target recognition module 139, which are executed under control of the processor 140. Models included in the speaker recognition module 133, the space recognition module 135, the object recognition module 137 or the target recognition module 139 may be understood as pieces of information associated with at least one user registered in the electronic device 100.

The speaker recognition module 133 may recognize the identity of a speaker of a user utterance when the user utterance is received through the microphone 110. To recognize at least one user registered in the electronic device 100, the speaker recognition module 133 may include a speaker recognition model corresponding to the at least one respective user.

When at least one user is registered in the electronic device 100, the speaker recognition module 133 may receive a reference utterance from each user through the microphone 110 and then may generate a speaker recognition model corresponding to each user by using a statistical feature of a feature vector extracted from the reference utterance. The statistical feature may include distribution of difference values between a feature vector extracted from a reference utterance of a specific user and feature vectors extracted from utterances that are uttered by the specific user multiple times.

When at least one user is registered in the electronic device 100, the speaker recognition module 133 may generate the speaker recognition model based on an image captured for each user (e.g., a still image or video). The speaker recognition module 133 may obtain (or capture) a face image of each user by using an image sensor included in the sensor module 160 and then generate a speaker recognition model corresponding to each user based on extraction of at least one feature point of the face image.

Similarly, the speaker recognition module 133 may obtain (or capture) an image of a user's body, by using an image sensor and/or depth sensor included in the sensor module 160 and then generate the speaker recognition model corresponding to each user by using the user's skeleton information, height information, and/or body size information that is determined based on the image of the body.

When at least one user is registered in the electronic device 100, the speaker recognition module 133 may obtain user biometric information by using a biometric sensor (e.g., a fingerprint sensor or an iris sensor) included in the sensor module 160, and then generate a speaker recognition model corresponding to each user based on the biometric information.

The speaker recognition module 133 may train the generated speaker recognition model. The speaker recognition module 133 may recognize a user (e.g., a speaker) who performs a user utterance by comparing the speaker recognition model with speech data, which is entered when the user utterance is received, or the obtained face image.

The space recognition module 135 may obtain map information about the specific space 10 in FIG. 1 (e.g., a home, an office, a classroom, a workplace, etc.), in which the electronic device 100 is positioned, and/or real-time location information of the electronic device 100 that is obtained through a location sensor included in the sensor module 160. The space recognition module 135 may store a space recognition model corresponding to at least one respective user registered in the electronic device 100. The space recognition model may include space information (e.g., room information, section information, etc.) mapped onto the corresponding user.

When at least one user is registered in the electronic device 100, each user may enter information about a room or section in the specific space 10 associated with him/her. For example, when the specific space 10 corresponds to a home, each user may enter his/her own bedroom information as the room information. When the specific space 10 corresponds to an office, each user may enter his/her own work space information as the section information.

A user may enter the room information or the section information in each time zone based on patterns of his/her locations or activities in a specific time zone. For example, a user may enter first room information or first section information in the first time zone and may enter second room information or second section information, which is different from the first room information or the first section information, in the second time zone. The space recognition module 135 may map room information or section information, which is entered by each user, onto the corresponding user and then may generate the space recognition model. The space recognition module 135 may update the generated space recognition model in real time or at specified periods.

When an arbitrary user is captured through an image sensor of the sensor module 160 while the electronic device 100 moves, the space recognition module 135 may recognize the captured user with reference to the above-described speaker recognition model (or a target recognition model). The space recognition module 135 may identify a room or section where the recognized user is located by using map information about the space 10 stored in the memory 130 and real-time location information of the electronic device 100, and may map information about the identified room or section and time stamp information of the capture onto the recognized user in order to be registered in the space recognition model.

When a speech signal corresponding to a user utterance is received through the microphone 110 while the electronic device 100 moves, the space recognition module 135 may recognize a user associated with the speech signal with reference to the above-described speaker recognition model (or a target recognition model). The space recognition module 135 may map information about a room or section, in which the recognized user is located, and time stamp information at a point in time when the speech signal is received, onto the recognized user in order to be registered in the space recognition model.

When the space recognition model is updated, the space recognition module 135 may remove previously-updated information (e.g., information about a room or section and time stamp information that are mapped onto a user) from the space recognition model.

The object recognition module 137 may recognize an object in an image obtained (or captured) through an image sensor of the sensor module 160 when the electronic device 100 moves. The object recognition module 137 may include an object recognition model that supports recognition of at least one object in the specific space 10 in which the electronic device 100 is positioned. The object recognition module 137 may perform machine learning (e.g., deep learning) on an image of an object (e.g., household appliances or furniture), which is associated with the specific space 10 and which is entered by a developer or user of the electronic device 100. The object recognition module 137 may perform machine learning on an image, which is entered by the user and which is associated with an object owned by the user. For example, the object recognition module 137 may train an image associated with clothing or accessories that are regularly employed by a user. The object recognition module 137 may generate an object recognition model for at least one object included in an object image based on the machine learning.

When the object corresponds to clothing or accessories owned by the user, the object recognition module 137 may include information about a user (e.g., an owner of the object) associated with the object in an object recognition model at the time the object recognition model for the corresponding object is generated.

The object recognition module 137 may recognize at least one object included in the image by analyzing an image, which is captured through an image sensor of the sensor module 160 while the electronic device 100 moves, by using the object recognition model. The object recognition module 131 may identify a room or section, in which the recognized object is located, by using the map information about the specific space 10 and real-time location information of the electronic device 100 and may map information about the identified room or section and time stamp information of the capture onto the recognized object so as to be registered in the object recognition model.

When the electronic device 100 performs a task (e.g., transferring a message), the target recognition module 139 may recognize a user corresponding to a target of task execution. The target recognition module 139 may include a target recognition model used to recognize the target user. Similar to the generation of the speaker recognition model as described above, the target recognition module 139 may generate the target recognition model based on an utterance received from each user when at least one user is registered in the electronic device 100, biometric information (e.g., fingerprint information or iris information) received from each user, and/or a face image or body image obtained by capturing each user. The target recognition module 139 may identify the target of task execution based on a parameter (e.g., a message recipient) included in a sequence received from the intelligent server 200 and then recognize a user corresponding to the identified target by using the target recognition model when the electronic device 100 associated with the task execution is moved. The target recognition module 139 may determine a user, who corresponds to voice obtained when the electronic device 100 moves, biometric information detected when the electronic device 100 moves, or an image (captured when the electronic device 100 moves, by using the target recognition model and then recognize a user corresponding to the target by determining Whether the determined user corresponds to the identified target.

When generating the target recognition model based on a face image, the target recognition module 139 may generate the target recognition model by using a plurality of face images for each user. In an operation of registering at least one user in the electronic device 100, the target recognition module 139 may request the sensor module 160 to capture a plurality of facial images of each user by using an image sensor. For example, the target recognition module 139 may request the sensor module 160 to capture a left face image, a right face image, and a front face image of each user. The plurality of face images may then be used to recognize a user corresponding to a target.

The processor 140 may be implemented with at least one of a central processing unit (CPU), an application processor (AP), or a communication processor, and may control components of the electronic device 100. The processor 140 may be electrically or operatively connected to the components of the electronic device 100 in order to deliver at least one command associated with a functional operation to the components or to perform various arithmetic operations, data processing, etc. The processor 140 may control a functional operation of at least one module (e.g., the speaker recognition module 133, the space recognition module 135, the object recognition module 137, and/or the target recognition module 139) included in the memory 130.

The processor 140 may perform a functional operation of the at least one module in place of the at least one module. In this case, the processor 140 may perform speaker recognition, space recognition, object recognition, and/or target recognition of task execution with reference to at least one model (e.g., a speaker recognition model, a space recognition model, an object recognition model, or a target recognition model) stored in the memory 130. The processor 140 may build an IoT environment (or an IoT system) with at least one IoT device (e.g., a computer, a television (TV), or a sensing device) in the specific space 10, in which the electronic device 100 is positioned, by using the communication circuit 120. The processor 140 may receive a notification associated with a user registered in the electronic device 100 from the IoT device. When a specific user enters user personal information (e.g., a user identifier (ID)) or biometric information (e.g., fingerprint information or iris information) into the IoT device, the processor 140 may receive a notification that the information is received, from the corresponding IoT device.

The driving module 150 may support movement (or driving) of the electronic device 100. The driving module 150 may include at least one of a motor, a driving wheel that rotates by receiving power from the motor, and a steering unit that controls a steering angle of the driving wheel.

The sensor module 160 may generate a signal or data corresponding to an operating state of the electronic device 100 or an external environment state. The sensor module 160 may include a location sensor. The sensor module 160 may generate a real-time location signal or real-time location data according to stopping or moving the electronic device 100, based on the location sensor.

The sensor module 160 may include an image sensor. When at least one user is registered in the electronic device 100, the sensor module 160 may generate an image signal or data by using the image sensor, by capturing a face image or body image of each user or by capturing images of surrounding environments (e.g., surrounding objects, surrounding users, etc.) at a time when the electronic device 100 is stopped or moved.

The sensor module 160 may include a biometric sensor (e.g., an iris sensor or a fingerprint sensor) for generating physical signal or data that only the user has. The sensor module 160 may transmit the generated signal or data to the processor 140 or at least one module (e.g., the speaker recognition module 133, the space recognition module 135, the object recognition module 137, and/or the target recognition module 139) in the memory 130 depending on scheduled information or a request.

In addition to the location sensor or image sensor, the sensor module 160 may further include a proximity sensor for preventing collision with a surrounding object when the electronic device 100 moves.

The sensor module 160 may include a depth sensor for calculating a distance between the electronic device 100 and the surrounding object.

The sensor module 160 may determine a direction according to a user's gesture (e.g., a finger pointing in a specific direction, etc.) based on the depth sensor and the image sensor.

The speaker 170 may output specified speech data while the electronic device 100 performs a task. The specified speech data may include speech data received from the TTS module 213 of the intelligent server 200 in FIG. 3. The output of specified speech data by the speaker 170 may be understood as at least part of the task (e.g., transferring a message) performed by the electronic device 100. To efficiently output the speech data, the speaker 170 may include a plurality of speakers. At least part of the speaker 170 may be exposed to the outside through an area of the electronic device 100.

The display 180 may output specified visual content while the electronic device 100 performs a task. The specified visual content may include text data received from the ASR module 211 of the intelligent server 200 in FIG. 3. The visual content of the display 180 may be output at the same time with the speech data of the speaker 170, or the visual content of the display 180 may be output independently of the speech data of the speaker 170. For example, without outputting speech data of the speaker 170, the content of the display 180 may be output only in a specified time zone (e.g., a midnight time zone). The user may set the specified time zone associated with the output of the visual content of the display 180. When the electronic device 100 performs a task in the specified time zone, the processor 140 may control only the display 180 without controlling the speaker 170.

Figure 5:
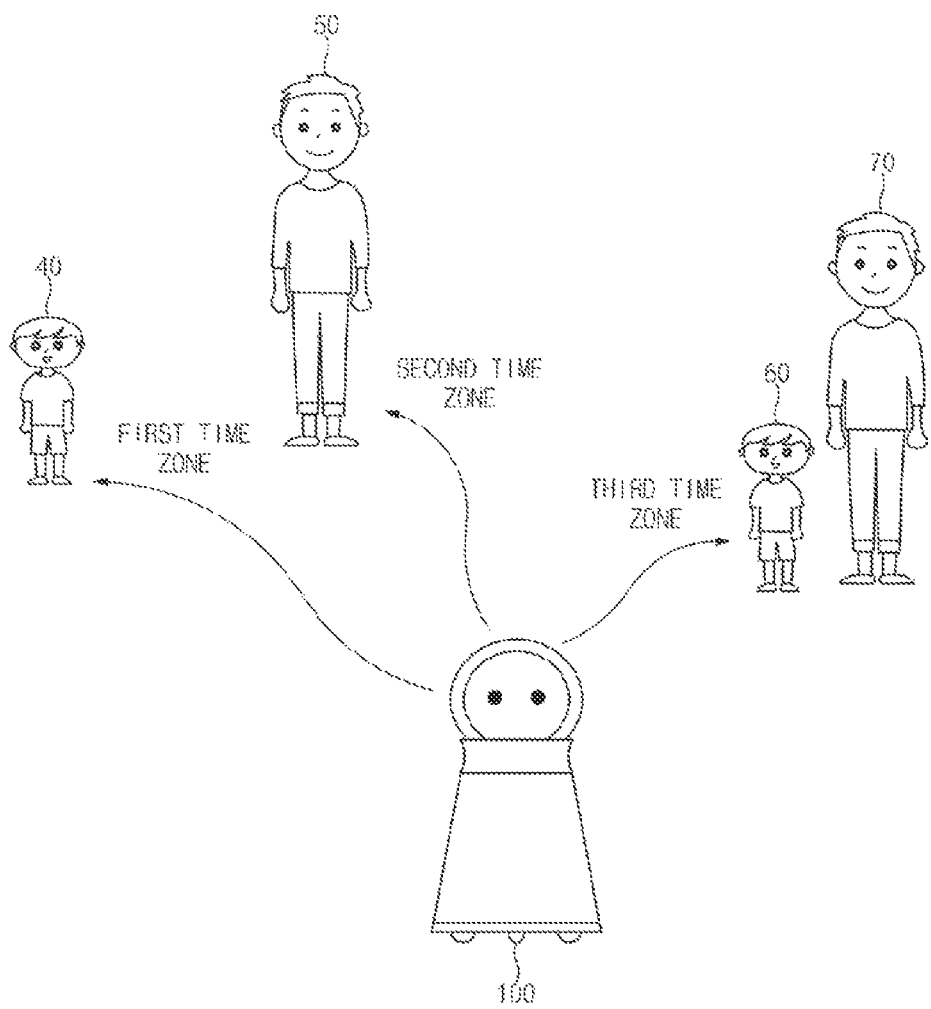
FIG. 5 illustrates a prediction form of a user utterance of an electronic device, according to an embodiment.

FIG. 5 illustrates a prediction form of a user utterance of an electronic device, according to an embodiment.

Referring to FIG. 5, the electronic device 100 may predict an utterance (e.g., a wake-up utterance or a task command utterance) (or an operation of a speech recognition service) of a specific user in each specified time zone. For example, when the electronic device 100 does not perform a task, the electronic device 100 may predict a user's utterance in each specified time zone and then move to a location close to the user.

More specifically, the processor 140 of the electronic device 100 may refer to room information or section information in each time zone of at least part of users, which is included in the memory 130 (or a space recognition model in the memory 130). The processor 140 may identify room information or section information corresponding to a current time in the memory 130 and then may move the electronic device 100 to the identified room or section by controlling the driving module 150.

When the current time is included in a first time zone while the electronic device 100 is not performing another task, the processor 140 may identify room information or section information corresponding to the first time zone with reference to the memory 130 (or the space recognition model in the memory 130). The processor 140 may predict an utterance of a third user 40 who enters room information or section information in the identified first time zone, and then may move the electronic device 100 to a room or section corresponding to the room information or section information in the first time zone. When room information or section information corresponding to the first time zone is not present in the room information or section information in each time zone, which is included in the memory 130, the processor 140 may maintain a current location of the electronic device 100. When the current time is included in the second time zone and the electronic device 100 is not performing the task, the processor 140 may predict an utterance of a fourth user 50, who enters room information or section information corresponding to the second time zone, and then may move the electronic device 100 to a room or section corresponding to the room information or section information in the second time zone.

Pieces of room information or section information corresponding to a third time zone may be present in room information or section information in each time zone of at least part of users, which is included in the memory 130 (or the space recognition model in the memory 130). The memory 130 may include room information or section information, which is entered by a fifth user 60, in the third time zone, and room information or section information, which is entered by a sixth user 70, in the third time zone.

The processor 140 may determine a priority for a room or section to which the electronic device 100 moves in the third time zone. For example, when at least one user is registered in the electronic device 100, the processor 140 may determine a priority with reference to user personal information (e.g., a name, an age, a gender, a body characteristic, a medical history, etc.) entered by each user. The processor 140 may identify a user, who satisfies a specified condition (e.g., whether a user is an infant, whether a user is elderly person, whether a user is a disabled person, whether a user is a patient, etc.), from among a plurality of users (e.g., the fifth user 60 and the sixth user 70), who enter room information or section information corresponding to the third time zone, based on the user personal information and may move the electronic device 100 to a room or section corresponding to the identified user. The processor 140 may identify who that more often operates the speech recognition service by identifying a history (e.g., the number of times that a task command utterance is performed, etc.), in which the plurality of users have operated the speech recognition service, and then may move the electronic device 100 to a room or section corresponding to the identified user. Even though pieces of room information or section information corresponding to a specific time zone may not be present, the processor 140 may determine a room or section, to which the electronic device 100 will move, based on priority information entered by the user.

Figure 6:
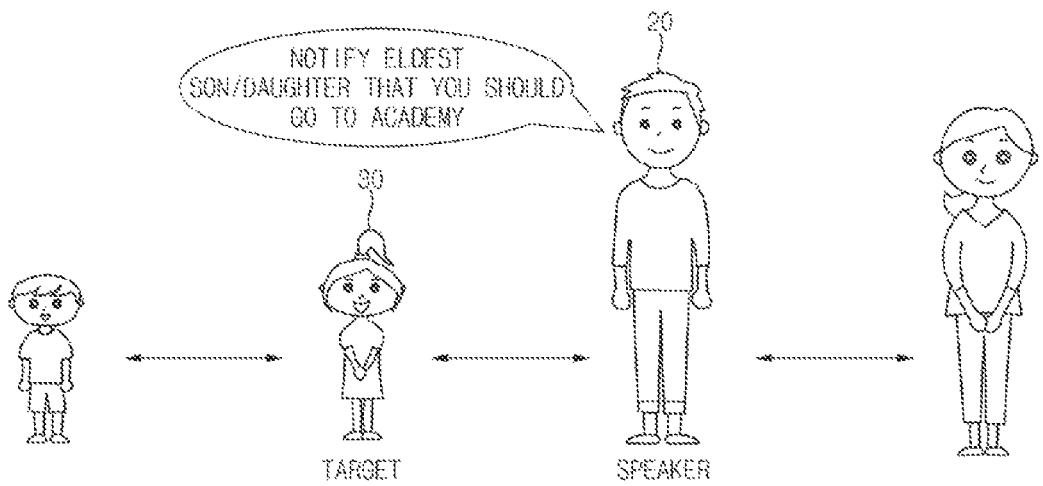
FIG. 6 illustrates a target identification form of an electronic device, according to an embodiment.

FIG. 6 illustrates a target identification form of an electronic device, according to an embodiment.

Referring to FIG. 6, at least one word indicating a target of task execution may be included in a user utterance (e.g., a task command utterance) received by the electronic device 100. The processor 140 (or the target recognition module 139) of the electronic device 100 may receive a sequence associated with the task execution from the NLU module 212 of the intelligent server 200 in FIG. 3, and then may identify a target user, which corresponds to a parameter (e.g., a target person) included in the sequence, from among at least one user registered in the electronic device 100.

The target recognition module 139 in the memory 130 may include a target database used to identify the target user. The target database may be individually generated for each user when at least one user is registered in the electronic device 100. For example, the target database corresponding to a specific user may include user personal information (e.g., a name, a position, a relationship with other users, etc.) entered by the corresponding user. The target database corresponding to the specific user may include information (e.g., a nickname of a specific user, a name of a specific user, etc.), which is entered by at least another user, for the specific user.

As an example of identifying a target user based on the target database, the electronic device 100 may receive a task command utterance from the first user 20 (e.g., "notify the eldest son/daughter that you should go to an academy") and then may receive a sequence of operations of the electronic device 100 from the NLU module 212 of the intelligent server 200 in response to receiving the task command utterance. As the task command utterance includes at least one word indicating the target of task execution (e.g., the eldest son/daughter), a sequence received from the intelligent server 200 may include a parameter (e.g., target person_eldest son/daughter) corresponding to a word indicating the target. The processor 140 (or the target recognition module 139) of the electronic device 100 may identify the second user 30 corresponding to the parameter of the sequence with reference to a target database for at least one respective user that is registered. For example, the processor 140 may identify the target database including user personal information (e.g., Yoojin Kim), nickname information (e.g., Princess), or name information (e.g., the eldest son/daughter, the eldest daughter, the first son/daughter, our daughter, etc.) corresponding to the parameter and then may identify a user associated with the identified target database as the second user 30 that is the target of task execution.

At least one word indicating the target of task execution may not be present in the task command utterance of the first user 20 that is received by the electronic device 100. In this case, the electronic device 100 may receive, from the intelligent server 200, a sequence in which at least one parameter (e.g., a target person) associated with the target is missing. The processor 140 may identify the missing parameter of the sequence and may request the first user 20 to enter information corresponding to the target (or corresponding to the missing parameter). For example, the processor 140 may output a specified speech (e.g., "please tell me a message recipient") by controlling the speaker 170 of the electronic device 100. Alternatively, the processor 140 may output a graphic user interface including a specified text (e.g., "please enter a message recipient) by controlling the display 180 of the electronic device 100. The graphical user interface may include a software input panel (SIP) keyboard that supports a user input.

Figure 7:
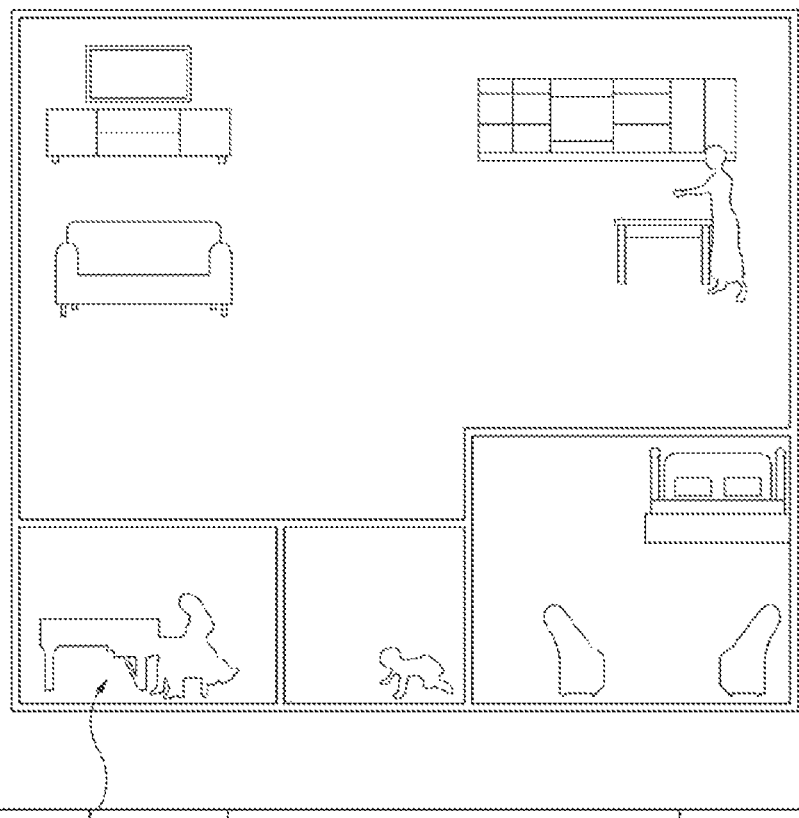
FIG. 7 illustrates a space determination form of an electronic device according to an embodiment.

FIG. 7 illustrates a space determination form of an electronic device, according to an embodiment.

Referring to FIG. 7, with regard to the task execution, at least one word indicating a room or section, to which the electronic device 100 moves, may be included in the task command utterance received by the electronic device 100. The processor 140 (or the space recognition module 135) of the electronic device 100 may receive a sequence of operations of the electronic device 100 from the NLU module 212 of the intelligent server 200, and then may determine a room or section, which corresponds to a parameter (e.g., a room) included in the sequence, in the specific space 10 (e.g., a home, an office, a classroom, a workplace, etc.) where the electronic device 100 is positioned.

The space recognition module 135 in the memory 130 may include a space database used to determine the room or section. When at least one user is registered in the electronic device 100, the space database may be individually generated for at least one room or section included in the specific space 10. The space database corresponding to a specific room or section may be generated to include information (e.g., a name of the room or section referred to by a user, etc.) entered by a user associated with the specific room or section. The space database corresponding to the specific room or section may be generated to include information (entered by at least another user other than a user associated with the specific room or section.

As an example of determining a room or section based on the space database, the electronic device 100 may receive a task command utterance from any speaker (e.g., "go to Yoojin's room and Tell Yoojin to come eat") and then may receive a sequence of operations of the electronic device 100 from the NUT module 212 of the intelligent server 200 in response to receiving the task command utterance. As the task command utterance includes at least one word indicating a room or section (e.g., Yoojin's room), to which the electronic device 100 will move, a sequence received from the intelligent server 200 may include a parameter (e.g., room_Yoojin's room) corresponding to a word indicating the room or section.

With reference to the space database for at least one room or section within the specific space 10 where the electronic device 100 is positioned, the processor 140 (or the space recognition module 135) of the electronic device 100 may determine a room or section corresponding to the parameter of the sequence. For example, the processor 140 may determine a space database including room name information or section name information (e.g., Yoojin's room, a room of the eldest son/daughter, a room of the first son/daughter, a princess's room, a computer room, or etc.), which corresponds to the parameter, and then may determine a room or section associated with the identified space database as a space to which the electronic device 100 will move.

In an operation of receiving a task command utterance, the electronic device 100 may also recognize a gesture of a user who performs a task command utterance. For example, the electronic device 100 may recognize a user gesture pointing to a specific room or section while receiving the task command utterance including a demonstrative pronoun (e.g., this, that, here, there, etc.). In this case, the processor 140 of the electronic device 100 may determine a direction of the user gesture by using an image sensor and a depth sensor, which are included in the sensor module 160, and then determine a room or section, which is present in the determined direction, as a space corresponding to a demonstrative pronoun and to which the electronic device 100 will move.

Figure 8:
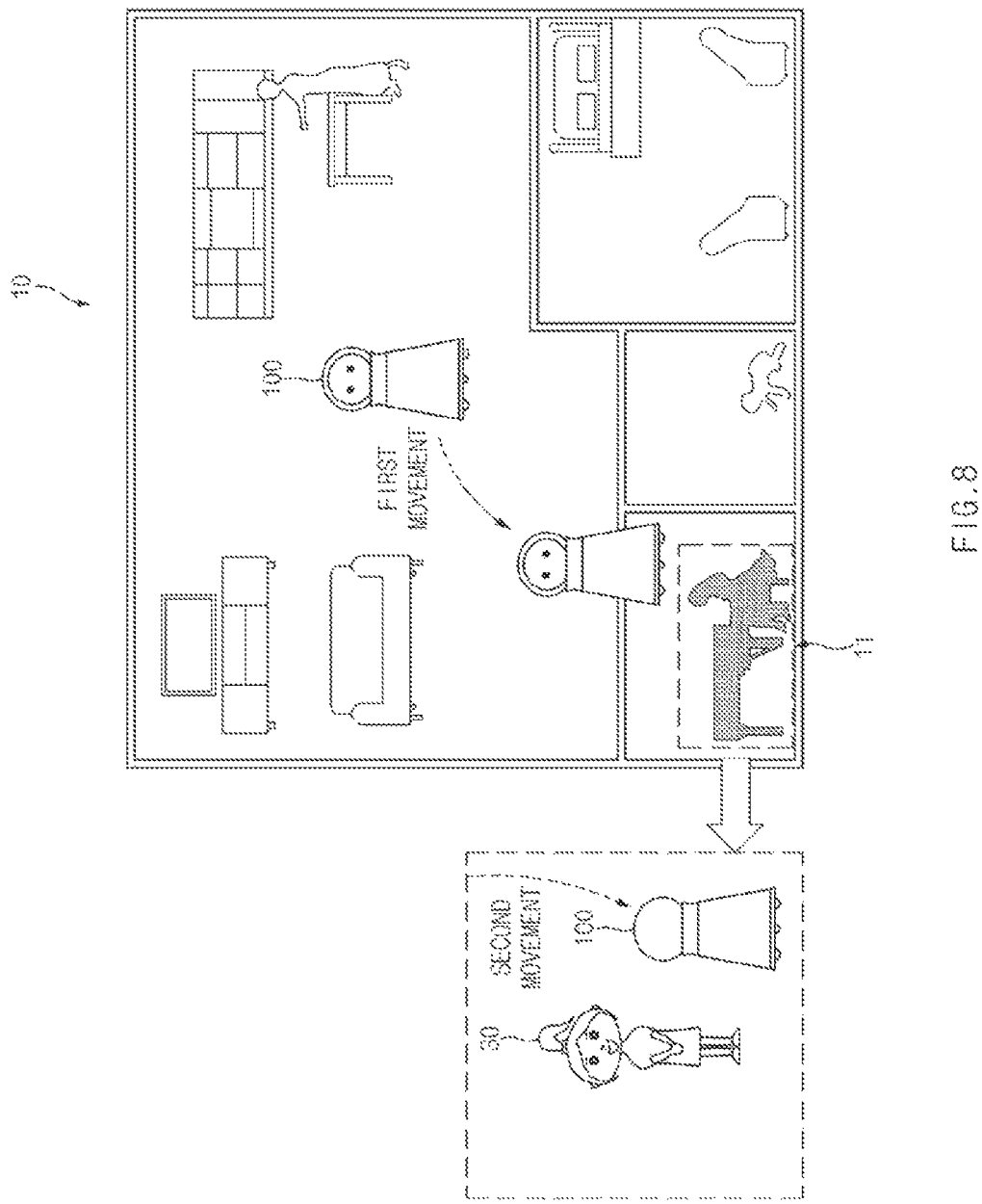
FIG. 8 illustrates a movement form of an electronic device, according to an embodiment.

FIG. 8 illustrates a movement form of an electronic device, according to an embodiment.

Referring to FIG. 8, with regard to the execution of a task according to receiving a task command utterance, the electronic device 100 may move inside the specific space 10 in which the electronic device 100 is positioned. The task command utterance may include at least one word indicating a target of the task execution, and at least one word indicating a space, to which the electronic device 100 will move when performing a task. In this case, the processor 140 of the electronic device 100 may determine a user, which corresponds to a target of the task execution, and a room or section, to which the electronic device 100 will move, with reference to a target database and a space database that are included in the memory 130.

The processor 140 may determine the target user and a room or section, to which the electronic device 100 will move, by identifying information corresponding to at least one parameter (e.g., a target person and/or room) in a sequence, which is provided from the intelligent server 200, based on information included in the target database and space database. The processor 140 may control the driving module 150 to move the electronic device 100 into a room or section where the determined target user is positioned. The room or section may be understood as a first location to which the electronic device 100 will move.

The task command utterance may or may not include a word indicating a space to which the electronic device 100 will move during the task execution, but no words indicating a target of the task execution. In this case, the processor 140 may request the speaker of the task command utterance to enter information corresponding to the target of the task. For example, the processor 140 may output a specified speech for requesting the user to enter the information by controlling the speaker 170. The processor 140 may output a graphic user interface including text associated with a request for entering the information by controlling the display 180.

The task command utterance may include a word indicating a target of the task execution but not include any words indicating a space to which the electronic device 100 will move during the task execution. In this case, the processor 140 may identify a target user corresponding to at least one parameter (e.g., a target person) in a sequence provided from the intelligent server 200 with reference to a target database included in the memory 130. The processor 140 may infer a location of the target user based on space information mapped onto the target user included in the memory 130 (or the space recognition model in the memory 130). The processor 140 may infer a room or section, in which the target user is expected to be present, based on the space information mapped onto the target user and may determine the inferred room or section as the first location to which the electronic device 100 is to be moved in relation to task execution.

With regard to the location inference of the target user, the processor 140 may refer to at least one information, which is included in the memory 130, depending on a specified priority. The processor 140 may refer to an update history of a space recognition model, which is included in the memory 130 and which is associated with the target user, in the first order. The updating of the space recognition model may include mapping information about a room or section in which the recognized user is positioned, and time stamp information of a capture onto the recognized user in order to be registered, when an arbitrary user is recognized through the capture while the electronic device 100 moves. When it is determined that the space recognition model corresponding to the identified target user is updated, the processor 140 may identify the time stamp information mapped onto the target user depending on the update. When it is determined, based on a time at which the target user's location is inferred, that the identified time stamp information. Is within a specified threshold time range, the processor 140 may infer the room or section mapped onto the time stamp information as a location of the identified target user and then may determine the corresponding room or section as the first location to which the electronic device 100 is to be moved.

With regard to the location inference of the target user, the processor 140 may refer to space information in each time zone, which is included in the memory 130 and which is mapped onto the target user, in the second order. The processor 140 may determine whether there is room information or section information, which is mapped onto the target user, based on a time zone including a current time on a space recognition model associated with the identified target user. When room information or section information in the time zone including the current time is present in the space recognition model associated with the target user, the processor 140 may infer the room or section in the corresponding time zone as a location of the identified target user at the current time, and then may determine the inferred room or section as the first location to which the electronic device 100 is to be moved.

With regard to the location inference of the target user, the processor 140 may refer to space information (e.g., space information other than space information in each time zone), which is included in the memory 130 and which is mapped onto the target user, in the third order. The processor 140 may identify room information or section information, which is mapped onto the target user, in a space recognition model corresponding to the identified target user, infer the corresponding room or section as the location of the identified target user, and determine the inferred room or section as the first location to which the electronic device 100 is to be moved. When room information or section information that is mapped onto the target user are present in the space recognition model, the processor 140 may randomly select a room or section from a plurality of rooms or sections and then determine the selected room or section as the first location to which the electronic device 100 is to be moved.

With regard to the location inference of the target user, the processor 140 may refer to notification information received from at least one IoT device, which builds an IoT environment (or an IoT system) with the electronic device 100, in the fourth order. When user personal information or biometric information is entered into the IoT device, the notification information may be transmitted to the electronic device 100. The notification information may include a part of the user personal information (e.g., a name) and location information of the corresponding IoT device. When it is determined, based on the time that the target user's location is inferred, that the notification information received from at least one IoT device is present within the specified threshold time range, the processor 140 may determine the location of the IoT device included in the notification information as the first location to which the electronic device 100 is to be moved.

When a space recognition model associated with the identified target user is not present in the memory 130 (e.g., when a space recognition model corresponding to the target user is not generated), the processor 140 may move the electronic device 100 to a specified location in relation to task execution. For example, the processor 140 may identify a center of the specific space 10 (e.g., a living room, when the specific space 10 corresponds to a home) by using map information about the specific space 10, in which the electronic device 100 is positioned, and the real-time location information of the electronic device 100 and then may determine a room or section corresponding to the center as the first location to which the electronic device 100 is to be moved.

The processor 140 may move the electronic device 100 to the determined first location by controlling the driving module 150. When the electronic device 100 is located in the first location, the processor 140 may search for the identified target user. The processor 140 may control the driving module 150 to rotate the electronic device 100 at a specified angle (e.g., 360 degrees) at the first location. In the rotating operation, the processor 140 may collect information about a surrounding environment at the first location. The processor 140 may collect image information about the surrounding environment at the first location by controlling an image sensor included in the sensor module 160. Alternatively, the processor 110 may collect speech information about the surrounding environment at the first location by controlling the microphone 110. The processor 140 may compare the collected image information or speech information with target user-related information stored in the memory 130. When a specified object (e.g., a person) is detected from an image captured through the image sensor, the processor 140 may compare the object with the target recognition model corresponding to the target user and then determine whether the object corresponds to the target recognition model corresponding to the target user.

When the determination result indicates that the object matches a face image or body image included in the target recognition model of the target user by a specified ratio or more, the processor 140 may recognize a user associated with the object as the identified target user.

The processor 140 may compare a voice, which is received through the microphone 110, with a target recognition model corresponding to the target user and then may determine whether the voice corresponds to the target recognition model. When the determination result indicates that the received voice matches utterance data included in the target recognition model of the target user by a specified ratio or more, the processor 140 may recognize a user associated with the received voice as the identified target user.

The processor 140 may identify user information (e.g., an owner of clothing or accessories) in the object recognition model corresponding to an object captured through the image sensor (e.g., clothing or accessories). When the identified user information matches user information included in the target recognition model of the identified target user by a specified ratio or more, the processor 140 may recognize a user associated wearing or holding the object as the identified target user.

When the electronic device 100 completely rotates at a specified angle, the processor 140 may perform the above-described comparison operation, or may perform the above-described comparison operation in real time during the rotation at the specified angle. When the identified target user is recognized while the electronic device 100 rotates at the specified angle, the processor 140 may interrupt rotation control of the electronic device 100.

When the target user is not recognized at the first location, the electronic device 100 may return to the location where the task command utterance was received, and then the processor 140 may output speech data or visual content indicating that the target user was not recognized (or task execution was not completed), to the speaker who originally made the task command utterance.

The processor 140 may move the electronic device 100 to be close to an object (e.g., a user other than a target user) in an image captured through the image sensor and then may output speech data or visual content inquiring about a location of the target user.

The processor 140 may transmit information (e.g., a message) associated with task execution by communicating with a mobile communication terminal (e.g., a smartphone) owned by the target user.

When the target user is recognized at the first location, the processor 140 may move the electronic device 100 to the second location within a specified threshold distance range based on the target user by controlling the driving module 150. The sensor module 160 may include a depth sensor. The processor 140 may move the electronic device 100 within the threshold distance range based on distance information between the target user and the electronic device 100, which is calculated by the depth sensor. When the electronic device 100 moves within the threshold distance range, the processor 140 may capture the target user by using an image sensor of the sensor module 160. The processor 140 may compare the captured image with a face image included in the target recognition model corresponding to the target user. The processor 140 may compare the captured image with a left face image, right face image, and front face image of the target user included in the face image. The processor 140 may determine that a location within a specified threshold distance range is the second location. Herein, the captured image matching the front face image in the target recognition model corresponding to the target user by a specified ratio or more is obtained at the location within the specified threshold distance range. Afterward, the processor 140 may allow the electronic device 100 to move close to the recognized target user, by moving the electronic device 100 at a second location.

In an operation of capturing the target user, the processor 140 may output a specified sound by using the speaker 170 or may output a specified visual effect (e.g., the display 180 flickers) by using the display 180 such that the processor 140 allows the target user to recognize the proximity of the electronic device 100.

When the electronic device 100 moves within the threshold distance range, the processor 140 may output data for requesting user authentication by using the speaker 170 or the display 180 and then may detect user biometric information (e.g., fingerprint information or iris information), which is entered in response to the request, by using a biometric sensor. The processor 140 may recognize the target user or determine the target user, based on the detected biometric information.

When the electronic device 100 has moved to the second location, the processor 140 may perform a part of operations in a sequence according to task execution. For example, the processor 140 may output speech data (e.g., speech data corresponding to a task command utterance) received from the TTS module 213 of the intelligent server 200 by using the speaker 170.

When the task execution time of the electronic device 100 is included in a specified time zone (e.g., a midnight time zone), the processor 140 may exclude data output using the speaker 170, and output text data received from the ASR module 211 of the intelligent server 200 by using the display 180. The processor 140 may output speech data through the speaker 170 or text data through the display 180 and then may receive a response utterance from the target user through the microphone 110. In this case, the processor 140 may obtain text data or speech data, which is obtained by converting speech data corresponding to the response utterance, through interaction with the intelligent server 200, may move the electronic device 100 to a location of a user who performs a task command utterance, and may output the obtained text data or speech data. When it is recognized that the user who performed the task command utterance is busy (e.g., sleeping, showering, talking on a phone, etc.), the processor 140 may suspend outputting of the obtained text data or speech data response and then may determine when to output of the obtained text data or speech data response by periodically monitoring the user who performed the task command utterance.

When the user who performs the task command utterance is not recognized in a specific space where the electronic device 100 is positioned, the processor 140 may transmit the obtained text data or speech data by communicating with a mobile communication terminal owned by the user who performed the task command utterance.

Figure 9:
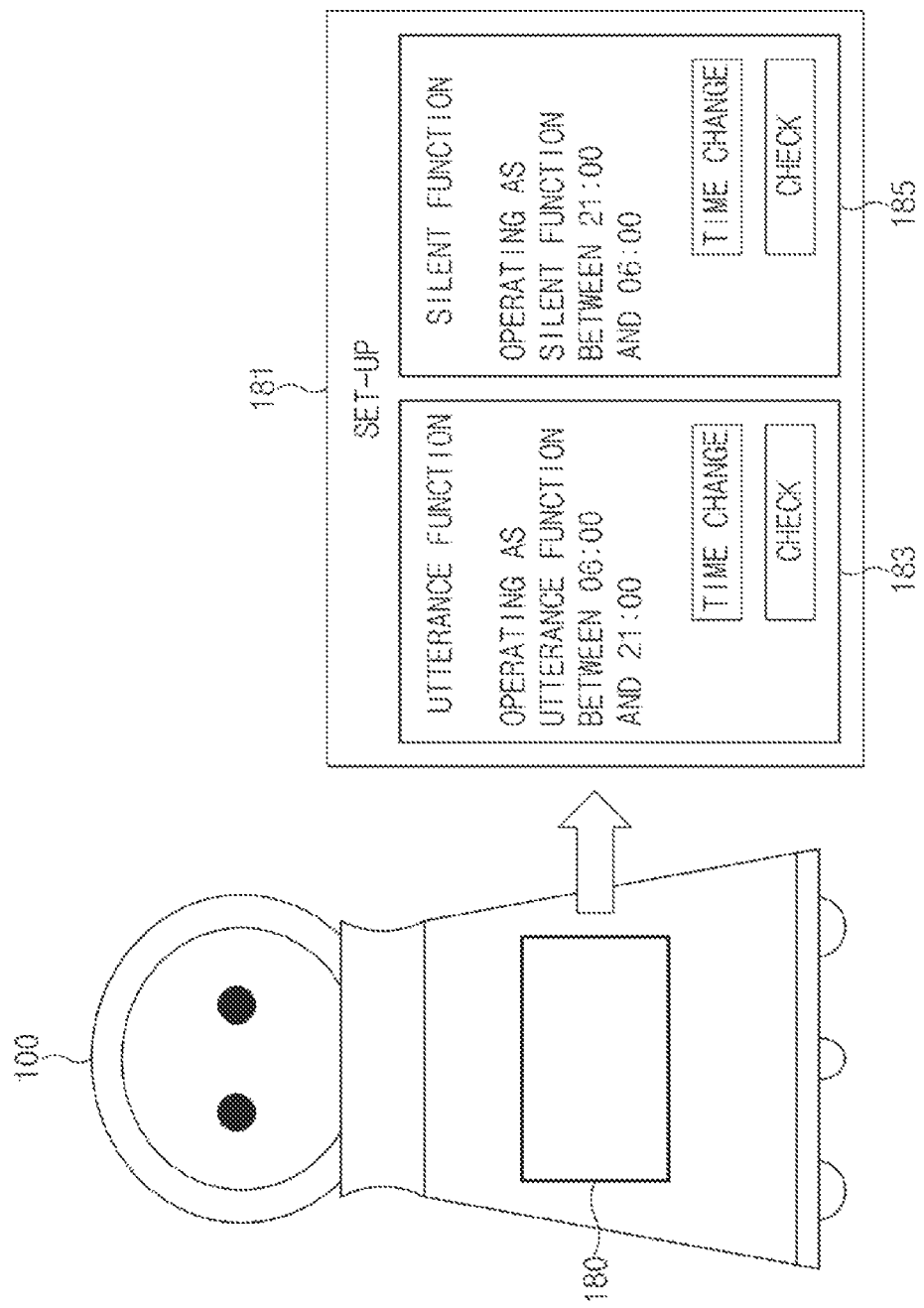
FIG. 9 illustrates a function setting screen of an electronic device, according to an embodiment.

FIG. 9 illustrates a function setting screen of an electronic device, according to an embodiment.

Referring to FIG. 9, the processor 140 of the electronic device 100 may output a specified screen by controlling the display 180. For example, the processor 140 may output a user interface 181 for selectively setting a function of the electronic device 100. The user interface 181 may include an interface 183 and an interface 185. The interface 183 may support the setting of an utterance function associated with an operation of the electronic device 100 in the first time zone. The interface 185 may support the setting of a silent function associated with an operation of the electronic device 100 in the second time zone. The utterance function and the silent function may be set simultaneously. In this case, the processor 140 may output specified speech data by using the speaker 170 when the electronic device 100 performs a task in the first time zone corresponding to the utterance function and may output specified text data by using the display 180 when the electronic device 100 performs a task in the second time zone corresponding to the silent function.

When separate settings for the silent function are excluded, the processor 140 may operate only the speaker 170 when the electronic device 100 performs a task in the first time zone and second time zone. The first time zone associated with the utterance function or the second time zone associated with the silent function may be changed by a user.

In addition to setting the above-described utterance function and/or silent function, the user interface 181 may further support settings for outputting the electronic device 100 speech data through the speaker 170 (e.g., a volume setting), a function of automatically switching to the silent function when the electronic device 100 enters a specific room or section, a function of automatically switching to the silent function when another business (e.g., sleeping, showering, talking on a phone, etc.) of the target user is recognized, etc.

Figure 10:
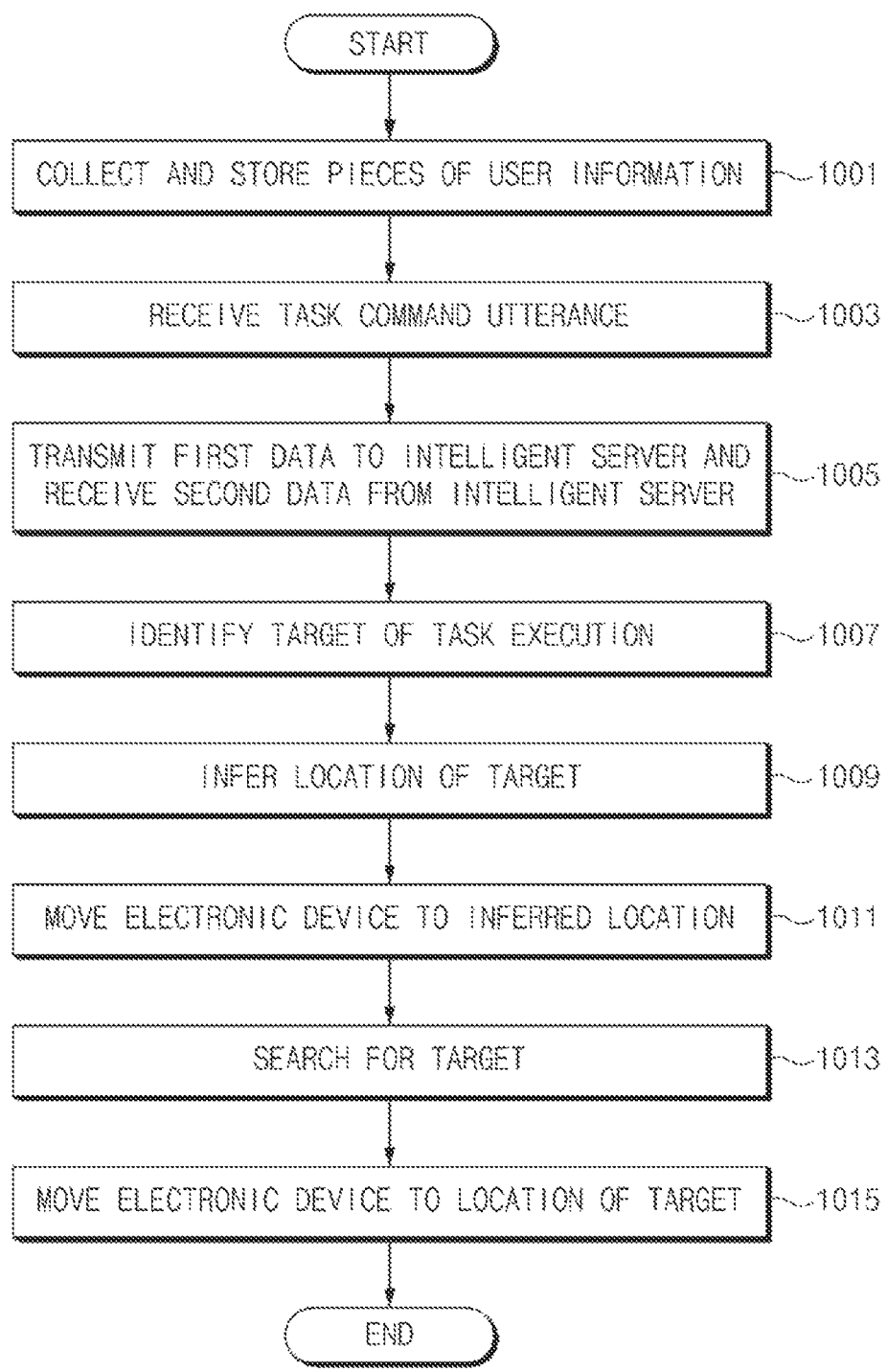
FIG. 10 is a flowchart illustrating a user input processing method of an electronic device, according to an embodiment.

FIG. 10 is a flowchart illustrating a user input processing method of an electronic device, according to an embodiment.

Referring to FIG. 10, in step 1001, the processor 140 of the electronic device 100 collects and stores user information. The processor 140 may collect information associated with each of a plurality of users registered in the electronic device 100. The user information may be used to recognize a speaker of a user utterance received by the electronic device 100 or to recognize a target associated with task execution of the electronic device 100.

The processor 140 may also generate and store a speaker recognition model and a target recognition model, which correspond to each user, as at least part of the user information. The processor 140 may receive an utterance from each user through the microphone 110 and may generate the speaker recognition model and the target recognition model by using feature vectors extracted from the utterance. The processor 140 may obtain (or capture) a face image or body image of each user by using an image sensor, and may generate the speaker recognition model and the target recognition model based on extracted feature points of the face image or may generate the speaker recognition model and the target recognition model by using a user's skeleton information, height information, or body size information that is determined based on the body image.

The processor 140 may receive room information or section information in a specific space (e.g., a space where the electronic device 100 is positioned) from each user and may generate a space recognition model by mapping the room information or the section information onto the corresponding user.

The processor 140 may generate a target database or a space database. The target database may be generated for each user. The target database may include user personal information (e.g., a name, a position, a relationship with other users, etc.), which is entered by the corresponding user, or information (e.g., a nickname of a specific user, a name of the specific user, etc.), which is entered for the specific user by at least another user. The space database may be generated for each room or section in a space where the electronic device is positioned. The space database may include information (e.g., a name of the room or section referred to by the corresponding user, etc.) entered by a user associated with the corresponding room (e.g., a user who employs the corresponding room or section as a bedroom or work space) or section or information entered by at least another user (e.g., a name of a room or section referred to by at least another user, etc.), which is not associated with the corresponding room or section.

In step 1003, the processor 140 receives a task command utterance including a command and intent, which are associated with specific task execution, through the microphone 110.

In step 1005, the processor 140 transmits first data according to the task command utterance to the intelligent server 200, which is connected to the electronic device 100 through a network, by using the communication circuit 120, and then receives second data from the intelligent server 200, in response to transmitting the first data. The second data may include information about an operation of the electronic device 100 associated with task execution and at least one parameter for performing the operation.

In step 1007, the processor 140 identifies a user corresponding to the target of task execution. When the task command utterance includes a word indicating the target of task execution, the processor may determine a user corresponding to a target of the task execution with reference to a target database that is generated in advance. The processor 140 may identify the target user by identifying information, which corresponds to a parameter (e.g., a target person) included in the second data, from among information included in the target database.

The task command utterance may not include any words indicating the target of the task execution. In this case, the processor 140 may request a user, who performs the task command utterance, to enter information corresponding to the target by controlling the speaker 170 or the display 180.

In step 1009, the processor 140 infers a location of the user corresponding to the target of the task execution. When the task command utterance includes a word indicating a space to which the electronic device 100 will move during task execution, the processor 140 may determine a room or section, to which the electronic device 100 will move, with reference to a space database that is generated in advance. However, when the task command utterance does not include any words indicating the space to which the electronic device 100 will move, the processor 140 may infer a room or section in which the target user is expected to be present, based on the space information mapped onto the target user included in the space recognition model that is generated in advance.

With regard to the location inference of the target user, the processor 140 may refer to at least one information, which is collected and stored in advance, depending on a specified priority. The processor 140 may refer to updated information of the space recognition model in the first order (e.g., an update of information about a room or section, in which an arbitrary user recognized when the electronic device 100 moves, is positioned and time stamp information at a time of the recognition). When it is determined that the space recognition model corresponding to the identified target user is updated, the processor 140 may identify the time stamp information of the corresponding update. When it is determined, based on a time at which the target user's location is inferred, that the time stamp information is included in a specified threshold time range, the processor 140 may infer a location of a room or section, which is updated together with the time stamp information, as a location of the identified target user.

The processor 140 may refer to space information in each time zone in the space recognition model corresponding to the target user in the second order. When room information or section information in the time zone including a current time is present in the space recognition model, the processor 140 may infer the room or section in the time zone as a location of the target user.

The processor 140 may refer to space information (e.g., space information other than space information in each time zone) included in the space recognition model corresponding to the target user in the third order. The processor 140 may identify room information or section information, which is mapped onto the target user, in the space recognition model and then may infer the corresponding room or section as the location of the target user.

The processor 140 may refer to notification information received from at least one IoT device, which builds an IoT environment with the electronic device 100, in the fourth order. When it is determined, based on the time that the target user's location is inferred, that the notification information received from at least one IoT device is present within the specified threshold time range, the processor 140 may determine the location of the IoT device included in the notification information as the first location to which the electronic device 100 is to be moved.

In step 1011, the processor 140 moves the electronic device 100 to the inferred location of the target user. The processor 140 may move the electronic device 100 to a room or section, which is inferred as the location of the target user, by controlling the driving module 150 included in the electronic device 100.

In step 1013, the processor 140 searches for the target user identified in the room or section according to the movement of the electronic device 100. The processor 140 may control the driving module 150 such that the electronic device 100 rotates at a specified angle (e.g., 360 degrees) in a room or section to which the electronic device 100 moves. During the rotation, the processor 140 may collect at least information about a surrounding environment. The processor 140 may collect image information or voice information about the surrounding environment by controlling the image sensor or the microphone 110 and then may compare the collected information with target user-related information. When the image information matches a face image or body image included in the target recognition model corresponding to the target user by a specified ratio or more, or the voice information matches utterance data of the target user included in the target recognition model by a specified ratio or more, the processor 140 may recognize a user associated with the image information or voice information as the target user. When the object recognized in the image information is recognized as clothing or accessories owned by a specific user with reference to an object recognition model, the processor 140 may recognize a user wearing or holding the object as the target user.

In step 1015, the processor 140 moves the electronic device 100 to a location close to the recognized target user. The processor 140 may move the electronic device 100 within a specified threshold distance range based on the recognized target user by controlling the driving module 150. The processor 140 may capture the target user by using an image sensor and then may compare the captured image with a face image included in the target recognition model corresponding to the target user. The face image included in the target recognition model may include a left face image, a right face image, and a front face image of the target user. The processor 140 may further move the electronic device 100 to a location at which the captured image matching the front face image within the specified threshold distance range by a specified ratio or more is obtained, the processor 140 may perform a part of operations e.g., an output of speech data or text data that is received from the intelligent server 200, etc.) according to task execution at the corresponding location. When moving the electronic device 100 within the specified threshold distance range, the processor 140 may output data for requesting user authentication through a speaker or a display and then may detect user biometric information, which is entered in response to the request, by using a biometric sensor. When the target user is further recognized based on the user biometric information, the processor 140 may perform a part of operations according to the task execution.

According to the above-described embodiments, an electronic device may include a memory, a microphone, a communication circuit, a driving module, a sensor module, and a processor operatively connected to the memory, the microphone, the communication circuit, the driving module, and the sensor module.

The processor may store information associated with each of a plurality of users in the memory, may receive a user utterance associated with task execution of the electronic device through the microphone, may transmit, to a specified external device, first data associated with the user utterance by using the communication circuit, may receive, from the external device, second data including information about at least one operation of the electronic device associated with the task execution and at least one parameter required to perform the operation by using the communication circuit, may identify a first user, which is associated with a target of the task execution, from among the plurality of users based on the at least one parameter, may infer a location of the target based on information associated with the first user, which is included in the information associated with the each of the plurality of users, may move the electronic device at a first location based on the inference by controlling the driving module, may search for the first user by comparing the information about the first user with information, which is obtained at the first location by using the sensor module or the microphone, and may move the electronic device to a second location within a specified threshold distance range based on the first user by controlling the driving module such that specified body information of the first user is obtained by using the sensor module when the first user is recognized based on the search.

The processor may generate a space recognition model corresponding to the each of some users by using space information in each time zone, which is entered from each of some users among the plurality of users, may store the space recognition model as information associated with the each of some users, and may move the electronic device at a third location corresponding to the identified space information by controlling the driving module when space information in a time zone corresponding to a current time is identified based on the space recognition model while the electronic device does not perform the task.

The processor may store user personal information, which is entered from the each of the plurality of users, as information associated with the each of the plurality of users, may identify user personal information corresponding to the at least one parameter when receiving the second data among the user personal information, and may identify a user corresponding to the identified user personal information as the first user associated with the target of the task execution.

The processor may generate a space recognition model corresponding to the each of the plurality of users by using space information entered from the each of the plurality of users, may store the space recognition model as information associated with the each of the plurality of users, and may determine a space corresponding to space information associated with the first user, as the first location by using the space recognition model as a part of the inferring of the location of the target.

The processor may generate a space recognition model corresponding to the each of the plurality of users by using space information entered from the each of the plurality of users, may store the space recognition model as information associated with the each of the plurality of users, and may map information about a space, in which the specific user is recognized, onto time stamp information of the recognition so as to be included in a space recognition model corresponding to the specific user while an electronic device is moved, when a specific user is recognized based on a capture through the sensor module or receiving speech signal through the microphone.

The processor may determine whether the space recognition model corresponding to the first user includes the time stamp information as a part of the inferring of the location of the target and may determine a space corresponding to the information about the space, which is mapped onto the time stamp information within the threshold time range, as the first location when it is determined, based on a time at which the location of the target is inferred, that the space recognition model corresponding to the first user includes the time stamp information within a specified threshold time range.

The processor may generate a space recognition model corresponding to the each of some users by using space information in each time zone, which is entered from each of some users among the plurality of users, may store the space recognition model as information associated with the each of some users, may determine whether a space recognition model corresponding to the first user includes space information in a time zone including a time at which the location of the target is inferred, as a part of the inferring of the location of the target, and may determine a space corresponding to the space information in the time zone including the time at which the location of the target is inferred, as the first location when the space recognition model corresponding to the first user includes the space information in the time zone including the time at which the location of the target is inferred.

The processor may generate a speaker recognition model corresponding to the each of the plurality of users by using utterance information received from the each of the plurality of users or image information obtained by capturing the each of the plurality of users, may store the speaker recognition model as information associated with the each of the plurality of users, and may recognize a second user, who performs the user utterance, by using the speaker recognition model when receiving the user utterance.

The processor may rotate the electronic device at a specified angle by controlling the driving module when the electronic device completely moves to the first location, and may obtain information about a surrounding environment at the first location by using the sensor module or the microphone.

The processor may generate a target recognition model corresponding to the each of the plurality of users by using utterance information received from the each of the plurality of users or image information obtained by capturing the each of the plurality of users, may store the target recognition model as information associated with the each of the plurality of users, and may recognize a user associated with the object or the voice as the first user when an object in image information obtained by using the sensor module at the first location or voice information obtained by using the microphone matches a target recognition model corresponding to the first user by a specified ratio or more.

The target recognition model corresponding to the first user may include front face information of the first user.

The processor may perform a capture for obtaining specified body information of the first user by using the sensor module while the electronic device moves within the specified threshold distance range and may determine a location within the specified threshold distance range, at which image information by the capture matching the front face information of the first user by a specified ratio or more is obtained, as the second location.

The electronic device may further include a speaker.

The second data may further include speech data corresponding to the first data.

The processor may output the speech data by using the speaker when the electronic device is moved to the second location.

According to the above-described embodiments, an electronic device may include a housing, a user interface, a driving unit disposed in the housing or connected to the housing so as to move the housing, a first sensor, the first sensor positioned on the housing or inside the housing, a second sensor, the second sensor positioned on the housing or inside the housing, a wireless communication circuit disposed inside the housing, a processor operatively connected to the user interface, the driving unit, the first sensor, the second sensor, and the wireless communication circuit, and a memory operatively connected to the processor.

The memory may store instructions that, when executed, cause the processor to receive a user utterance for performing a task through the user interface, to grasp a location of a target for performing the task based at least partly on first information sensed by using the first sensor and/or second information received from an external device through the wireless communication circuit, to move the housing to the location by using the driving unit, to recognize an object by using the second sensor, to determine whether the recognized object matches the target, and to perform the task on the object through the user interface.

According to the above-described embodiments, a user input processing method of an electronic device may include storing information associated with each of a plurality of users, receiving a user utterance associated with task execution of the electronic device, transmitting, to a specified external device, first data associated with the user utterance, receiving, from the external device, second data including information about at least one operation of the electronic device associated with the task execution, and at least one parameter required to perform the operation, identifying a first user, which is associated with a target of the task execution, from among the plurality of users based on the at least one parameter, inferring a location of the target based on information associated with the first user, which is included in the information associated with the each of the plurality of users, moving the electronic device to a first location based on the inference, searching for the first user by comparing the information about the first user with information obtained at the first location, and moving the electronic device to a second location within a specified threshold distance range based on the first user such that specified body information of the first user is obtained when the first user is recognized based on the search.

Storing of the information associated with the each of the plurality of users may include storing user personal information, which is entered from the each of the plurality of users, as information associated with the each of the plurality of users.

Identifying of the first user may include identifying user personal information corresponding to the at least one parameter when receiving the second data among the user personal information and identifying a user corresponding to the identified user personal information as the first user associated with the target of the task execution.

Storing of the information associated with the each of the plurality of users may include generating a space recognition model corresponding to each of the plurality of users by using space information entered from the each of the plurality of users and storing the space recognition model as information associated with the each of the plurality of users.

Inferring of the location of the target may include determining a space corresponding to space information associated with the first user as the first location by using the space recognition model.

Storing of the information associated with the each of the plurality of users may include generating a space recognition model corresponding to each of at least some users by using space information in each time zone, which is from the each of the at least some users among the plurality of users and storing the space recognition model as information associated with the each of the at least some users.

Inferring of the location of the target may include determining whether a space recognition model corresponding to the first user includes space information in a time zone including a time at which the location of the target is inferred, and determining a space corresponding to the space information in the time zone including the time at which the location of the target is inferred, as the first location when the space recognition model corresponding to the first user includes the space information in the time zone including the time at which the location of the target is inferred.

The user input processing method may further include rotating the electronic device at a specified angle by controlling the driving module when the electronic device is completely moved to the first location and obtaining information about a surrounding environment at the first location.

Storing of the information associated with the each of the plurality of users may include generating a target recognition model corresponding to the each of the plurality of users by using utterance information received from the each of the plurality of users or image information obtained by capturing the each of the plurality of users and storing the target recognition model as information associated with the each of the plurality of users.

Searching for the first user may include recognizing a user associated with the object or the voice as the first user when an object in image information or voice information obtained at the first location matches a target recognition model corresponding to the first user by a specified ratio or more.

Moving of the electronic device to the second location within the specified threshold distance range based on the first user may include performing a capture for obtaining specified body information of the first user while the electronic device moves within the specified threshold distance range and determining a location within the specified threshold distance range, at which image information by the capture matching front face information of the first user by a specified ratio or more is obtained, as the second location.

Figure 11:
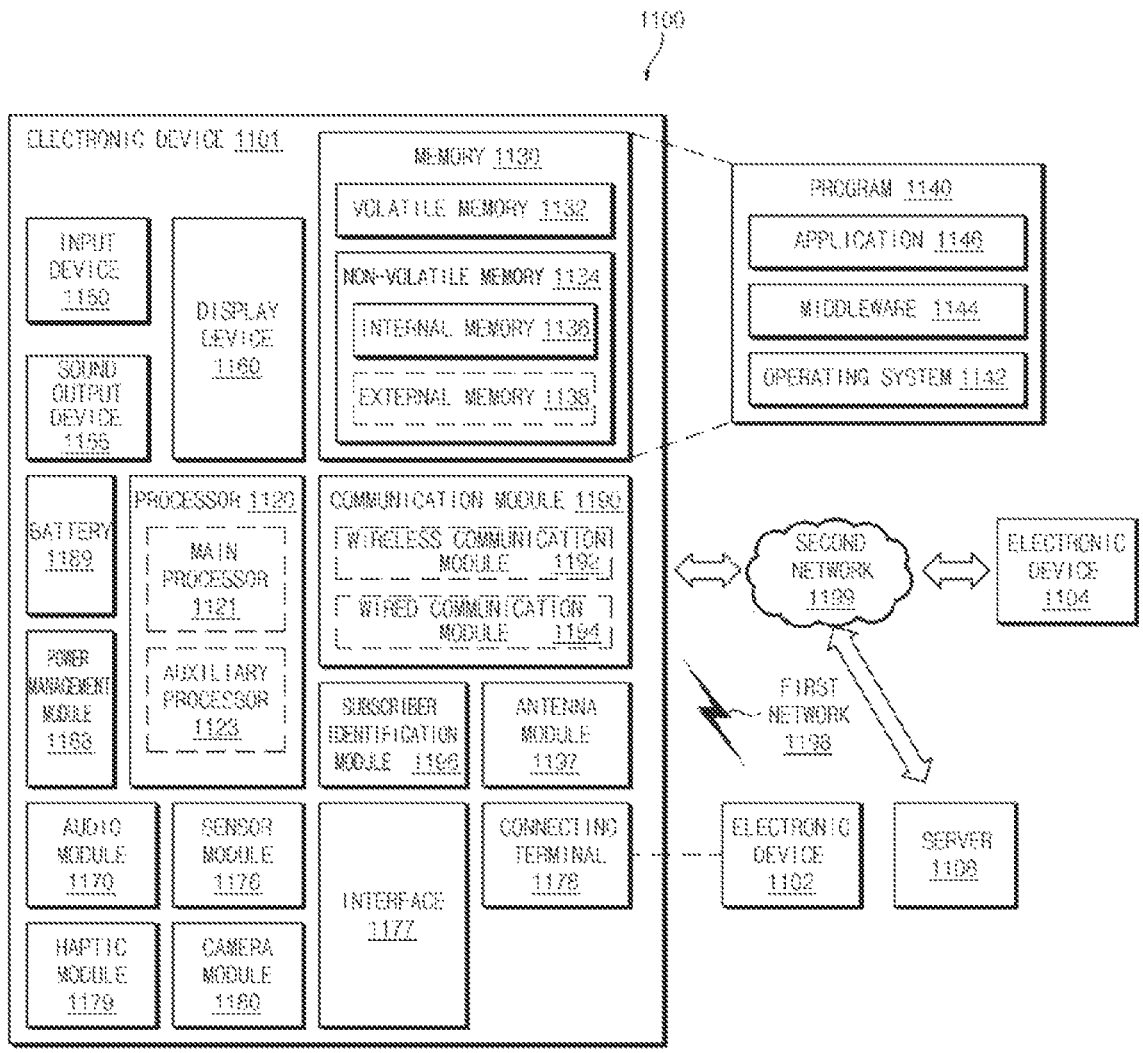
FIG. 11 illustrates an electronic device in a network environment, according to an embodiment.

FIG. 11 illustrates an electronic device in a network environment according to an embodiment.

Referring to FIG. 11, an electronic device 1101 may communicate with an electronic device 1102 through a first network 1198 (e.g., a short-range wireless communication network) or may communicate with an electronic device 1104 or a server 1108 through a second network 1199 (e.g., a long-distance wireless communication network) in a network environment 1100. According to an embodiment, the electronic device 1101 may communicate with the electronic device 1104 through the server 1108. According to an embodiment, the electronic device 1101 may include a processor 1120, a memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module 1196, or an antenna module 1197. According to some embodiments, at least one (e.g., the display device 1160 or the camera module 1180) among components of the electronic device 1101 may be omitted or one or more other components may be added to the electronic device 1101. According to some embodiments, some of the above components may be implemented with one integrated circuit. For example, the sensor module 1176 (e.g., a fingerprint sensor, an iris sensor, or an illuminance sensor) may be embedded in the display device 1160 (e.g., a display).

The processor 1120 may execute, for example, software (e.g., a program 1140) to control at least one of other components (e.g., a hardware or software component) of the electronic device 1101 connected to the processor 1120 and may process or compute a variety of data. According to an embodiment, as a part of data processing or operation, the processor 1120 may load a command set or data, which is received from other components (e.g., the sensor module 1176 or the communication module 1190), into a volatile memory 1132, may process the command or data loaded into the volatile memory 1132, and may store result data into a nonvolatile memory 1134. According to an embodiment, the processor 1120 may include a main processor 1121 (e.g., a central processing unit or an application processor) and an auxiliary processor 1123 (e.g., a graphic processing device, an image signal processor, a sensor hub processor, or a communication processor), which operates independently from the main processor 1121 or with the main processor 1121. Additionally or alternatively, the auxiliary processor 1123 may use less power than the main processor 1121, or is specified to a designated function. The auxiliary processor 1123 may be implemented separately from the main processor 1121 or as a part thereof.

The auxiliary processor 1123 may control, for example, at least some of functions or states associated with at least one component (e.g., the display device 1160, the sensor module 1176, or the communication module 1190) among the components of the electronic device 1101 instead of the main processor 1121 while the main processor 1121 is in an inactive (e.g., sleep) state or together with the main processor 1121 while the main processor 1121 is in an active an application execution) state. According to an embodiment, the auxiliary processor 1123 (e.g., the image signal processor or the communication processor) may be implemented as a part of another component (e.g., the camera module 1180 or the communication module 1190) that is functionally related to the auxiliary processor 1123.

The memory 1130 may store a variety of data used by at least one component (e.g., the processor 1120 or the sensor module 1176) of the electronic device 1101. For example, data may include software (e.g., the program 1140) and input data or output data with respect to commands associated with the software. The memory 1130 may include the volatile memory 1132 or the nonvolatile memory 1134.

The program 1140 may be stored in the memory 1130 as software and may include, for example, an operating system 1142, a middleware 1144, or an application 1146.

The input device 1150 may receive a command or data, which is used for a component (e.g., the processor 1120) of the electronic device 1101, from an outside (e.g., a user) of the electronic device 1101. The input device 1150 may include, for example, a microphone, a mouse, a keyboard, or a digital pen a stylus pen).

The sound output device 1155 may output a sound signal to the outside of the electronic device 1101. The sound output device 1155 may include, for example, a speaker or a receiver. The speaker may be used for general purposes, such as multimedia play or recordings play, and the receiver may be used for receiving calls. According to an embodiment, the receiver and the speaker may be either integrally or separately implemented.

The display device 1160 may visually provide information to the outside (e.g., the user) of the electronic device 1101. For example, the display device 1160 may include a display, a hologram device, or a projector and a control circuit for controlling a corresponding device. According to an embodiment, the display device 1160 may include a touch circuitry configured to sense the touch or a sensor circuit (e.g., a pressure sensor) for measuring an intensity of pressure on the touch.

The audio module 1170 may convert a sound and an electrical signal in dual directions. According to an embodiment, the audio module 1170 may obtain the sound through the input device 1150 or may output the sound through the sound output device 1155 or an external electronic device (e.g., the electronic device 1102 (e.g., a speaker or a headphone)) directly or wirelessly connected to the electronic device 1101.

The sensor module 1176 may generate an electrical signal or a data value corresponding to an operating state (e.g., power or temperature) inside or an environmental state (e.g., a user state) outside the electronic device 1101. According to an embodiment, the sensor module 1176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1177 may support one or more designated protocols to allow the electronic device 1101 to connect directly or wirelessly to the external electronic device (e.g., the electronic device 1102). According to an embodiment, the interface 1177 may include, for example, a high-definition multimedia interface (HDMI), a universal serial bus (USB) interface, a secure digital (SD) card interface, or an audio interface.

A connecting terminal 1178 may include a connector that physically connects the electronic device 1101 to the external electronic device (e.g., the electronic device 1102). According to an embodiment, the connecting terminal 1178 may include, for example, an HDMI connector, a USB connector, an SD card connector, or an audio connector (e.g., a headphone connector).

The haptic module 1179 may convert an electrical signal to a mechanical stimulation (e.g., vibration or movement) or an electrical stimulation perceived by the user through tactile or kinesthetic sensations. According to an embodiment, the haptic module 1179 may include, for example, a motor, a piezoelectric element, or an electric stimulator.

The camera module 1180 may shoot a still image or a video image. According to an embodiment, the camera module 1180 may include, for example, at least one or more lenses, image sensors, image signal processors, or flashes.

The power management module 1188 may manage power supplied to the electronic device 1101. According to an embodiment, the power management module 1188 may be implemented as at least a part of a power management integrated circuit (PMIC).

The battery 1189 may supply power to at least one component of the electronic device 1101. According to an embodiment, the battery 1189 may include, for example, a non-rechargeable (primary) battery, a rechargeable (secondary) battery, or a fuel cell.

The communication module 1190 may establish a direct (e.g., wired) or wireless communication channel between the electronic device 1101 and the external electronic device (e.g., the electronic device 1102, the electronic device 1104, or the server 1108) and support communication execution through the established communication channel. The communication module 1190 may include at least one communication processor operating independently from the processor 1120 (e.g., the application processor) and supporting the direct (e.g., wired) communication or the wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication module). The corresponding communication module among the above communication modules may communicate with the external electronic device through the first network 1198 (e.g., the short-range communication network such as a. Bluetooth, a Wi-Fi direct, or an infrared data association (IrDA)) or the second network 1199 (e.g., the long-distance wireless communication network such as a cellular network, an internet, or a computer network (e.g., a LAN or wide area network (WAN)). The above-mentioned various communication modules may be implemented into one component (e.g., a single chip) or into separate components (e.g., chips), respectively. The wireless communication module 1192 may identify and authenticate the electronic device 1101 using user information (e.g., international mobile subscriber identity (IMSI)) stored in the subscriber identification module 1196 in the communication network, such as the first network 1198 or the second network 1199.

The antenna module 1197 may transmit or receive a signal or power to or from the outside (e.g., the external electronic device) of the electronic device 1101. According to an embodiment, the antenna module 1197 may include an antenna including a radiating element composed of a conductive material or a conductive pattern formed in or on a substrate (e.g., a printed circuit board (PCB)). According to an embodiment, the antenna module 1197 may include a plurality of antennas. In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

At least some components among the components may be connected to each other through a communication method (e.g., a bus, a general purpose input and output (GPIO), a serial peripheral interface (SPI), or a mobile industry processor interface (MIPI)) used between peripheral devices to exchange signals (e.g., a command or data) with each other.

According to an embodiment, the command or data may be transmitted or received between the electronic device 1101 and the external electronic device 1104 through the server 1108 connected to the second network 1199. Each of the electronic devices 1102 and 1104 may be the same or different types as or from the electronic device 1101.

According to an embodiment, all or some of the operations performed by the electronic device 1101 may be performed by one or more external electronic devices among the external electronic devices 1102, 1104, or 1108. For example, when the electronic device 1101 performs some functions or services automatically or by request from a user or another device, the electronic device 1101 may request one or more external electronic devices to perform at least some of the functions related to the functions or services, in addition to or instead of performing the functions or services by itself. The one or more external electronic devices receiving the request may carry out at least a part of the requested function or service or the additional function or service associated with the request and transmit the execution result to the electronic device 1101. The electronic device 1101 may provide the result as is or after additional processing as at least a part of the response to the request. To this end, for example, a cloud computing, distributed computing, or client-server computing technology may be used.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order), it is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Various embodiments of the disclosure may be implemented by software (e.g., the program 1140) including an instruction stored in a machine-readable storage medium (e.g., an internal memory 1136 or an external memory 1138) readable by a machine (e.g., the electronic device 1101). For example, the processor (e.g., the processor 1120) of a machine (e.g., the electronic device 1101) may call the instruction from the machine-readable storage medium and execute the instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

A method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding component prior to the integration. According to various embodiments, operations performed by a module, a programming, or other components may be executed sequentially, in parallel, repeatedly, or in a heuristic method, or at least some operations may be executed in different sequences, omitted, or other operations may be added.

According to the above-described embodiments, an electronic device may closely move to a location of a target user (e.g., a message recipient) associated with the execution of a task transferring a message) and then may perform the task, thereby intuitively providing the target user with information according to task execution.

According to the above-described embodiments, even when there is no location information of the target user associated with the task execution on a user utterance, the electronic device may perform a task by inferring the location of the target user, thereby improving reliability of the task execution.

While the disclosure has been shown and described with reference to certain embodiments and drawings thereof, it will be understood by those skilled in the art that various changes in form and details may be made therein without departing from the spirit and scope of the disclosure as defined by the appended claims and any equivalents thereof.

What is claimed is:

1. An electronic device, comprising:
   a memory;
   a microphone;
   a driving module;
   a sensor module; and
   a processor operatively connected to the memory, the microphone, the driving module, and the sensor module,
   wherein the processor is configured to:
      store, in the memory, a database including information associated with each of a plurality of users,
      receive, through the microphone, an utterance associated with executing a task,
      based on first data associated with the utterance, obtain, second data including information about a sequence of operations associated with executing the task and at least one parameter for performing the sequence of operations,
      based on the at least one parameter and the database, identify a target user associated with executing the task, from among the plurality of users and determine a space associated with the target user,
      move, by controlling the driving module, the electronic device from a first location where the electronic device is located, to a second location associated with the determined space,
      in response to determining that the electronic device has moved to the second location, identify at least one person positioned at the determined space by performing, using the sensor module, a search operation for the determined space,
      in response to identifying the at least one person, determine whether the at least one person corresponds to the identified target user,
      in response to determining that the at least one person corresponds to the identified target user, move, by controlling the driving module, the electronic device to a third location within a specified threshold distance range based on the at least one person corresponding to the target user, and execute the task based on the sequence of operations, and
      in response to determining that the at least one person does not correspond to the identified target user, inquire about a location of the target user to the at least one person, move, by controlling the driving module, the electronic device to the first location, and provide a search result indicating that the target user is not present at the determined space.

2. The electronic device of claim 1, wherein the processor is further configured to:
   rotate, by controlling the driving module, the electronic device at a specified angle at the second location,
   obtain information about a surrounding environment while the electronic device is rotated, and
   perform the search operation for the determined space based on the obtained information.

3. The electronic device of claim 2, wherein the obtained information about the surrounding environment includes image information associated with the determined space.

4. The electronic device of claim 1, wherein the processor is further configured to request an additional utterance for identifying the target user, if the target user associated with executing the task is not identified.

5. The electronic device of claim 1, further comprising a communication circuit configured to establish communication with an external device,
   wherein the processor is further configured to:
   transmit the first data to the external device, and
   in response to the first data, receive the second data from the external device.

6. A method of an electronic device, the method comprising:
   storing, in the electronic device, a database including information associated with each of a plurality of users;
   receiving, through a microphone of the electronic device, an utterance associated with executing a task;
   based on first data associated with the utterance, obtaining second data including information about a sequence of operations associated with executing the task and at least one parameter for performing the sequence of operations;
   based on the at least one parameter and the database, identifying a target user associated with executing the task, from among the plurality of users and determining a space associated with the target user;
   moving, by controlling a driving module of the electronic device, the electronic device from a first location where the electronic device is located, to a second location associated with the determined space;
   in response to determining that the electronic device has moved to the second location, identify at least one person positioned at the determined space by performing a search operation for the determined space;
   in response to identifying the at least one person, determining whether the at least one person corresponds to the identified target user;
   in response to determining that the at least one person corresponds to the identified target user, moving, by controlling the driving module, the electronic device to a third location within a specified threshold distance range based on the at least one person corresponding to the target user, and executing the task based on the sequence of operations; and
   in response to determining that the at least one person does not correspond to the identified target user, inquiring about a location of the target user to the at least one person, moving, by controlling the driving module, the electronic device to the first location, and providing a search result indicating that the target user is not present at the determined space.

7. The method of claim 6, further comprising:
rotating, by controlling the driving module, the electronic device at a specified angle at the second location;
obtaining information about a surrounding environment while the electronic device is rotated; and
performing the search operation for the determined space based on the obtained information.

8. The method of claim 7, wherein the obtained information includes image information associated with the determined space.

9. The operation method of claim 6, further comprising:
transmitting the first data to an external device, and
in response to the first data, receiving the second data from the external device.

* * * * *